United States Patent [19]
Arai et al.

[11] Patent Number: 6,121,977
[45] Date of Patent: *Sep. 19, 2000

[54] METHOD AND APPARATUS FOR CREATING IMAGE AND COMPUTER MEMORY PRODUCT

[75] Inventors: Masatoshi Arai; Masahiko Sugimura; Koichi Murakami, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/946,913

[22] Filed: Oct. 9, 1997

[30] Foreign Application Priority Data

Oct. 18, 1996 [JP] Japan .................................... 8-297672
Apr. 4, 1997 [JP] Japan .................................... 9-086977

[51] Int. Cl.$^7$ ............................................ G06F 15/00
[52] U.S. Cl. ................................................ 345/433
[58] Field of Search ......................... 345/473, 474, 345/475, 433, 121

[56] References Cited

U.S. PATENT DOCUMENTS

| | | | |
|---|---|---|---|
| 5,706,417 | 1/1998 | Adelson | 395/129 |
| 5,724,499 | 3/1998 | Nishiyama et al. | 395/173 |
| 5,917,494 | 6/1999 | Arai et al. | 345/417 |

OTHER PUBLICATIONS

Heckbert, "Ray Tracing JELL–O Brand Gelatin", Computer Graphics, vol. 21, No. 4, Jul. 1987 pp. 73–74.

*Primary Examiner*—Phu K. Nguyen
*Attorney, Agent, or Firm*—Staas & Halsey LLP

[57] ABSTRACT

A water surface region is divided into elongated (or vertical) slice regions, an image is drawn by randomly swaying each slice region, and the foregoing process is repeated so that sway of the water surface is expressed. An ellipse is enlarged and the color is gradually made to be the same as the color of the surrounding water surface so that ripples are expressed. The water surface is divided into a plurality of regions which are sequentially subjected to a process for elongating the regions so that waves are expressed. Images of sprays and ellipses which are gradually enlarged are superimposed so that sprays occurring because of a rain are expressed.

44 Claims, 44 Drawing Sheets

ORIGINAL IMAGE u u  SWAY  u u
    REGION

CHANGED IMAGE 0.1 sec

CHANGED IMAGE 0.1 sec

CHANGED IMAGE

LATERAL WIDTH w(0)
VERTICAL LEVEL h(0)

LATERAL WIDTH w(i)
VERTICAL LEVEL h(i)

LATERAL WIDTH w(N)
VERTICAL LEVEL h(N)

FIG. 21
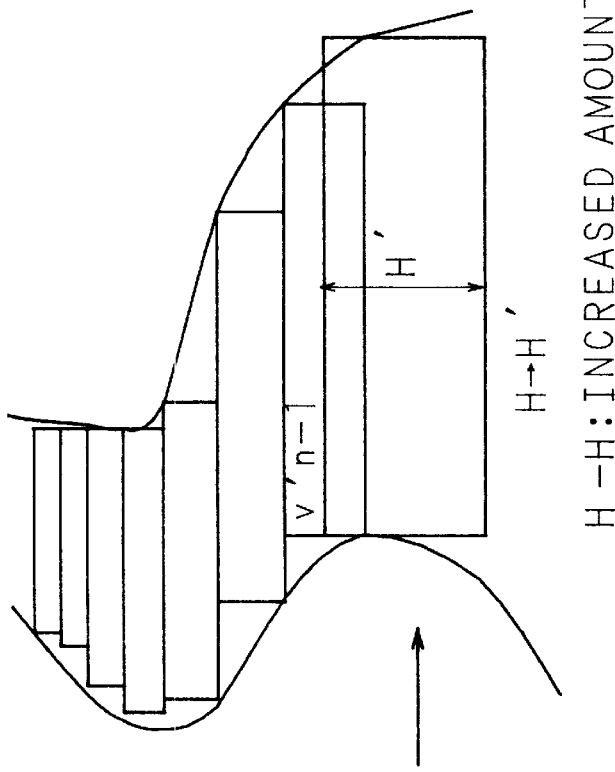
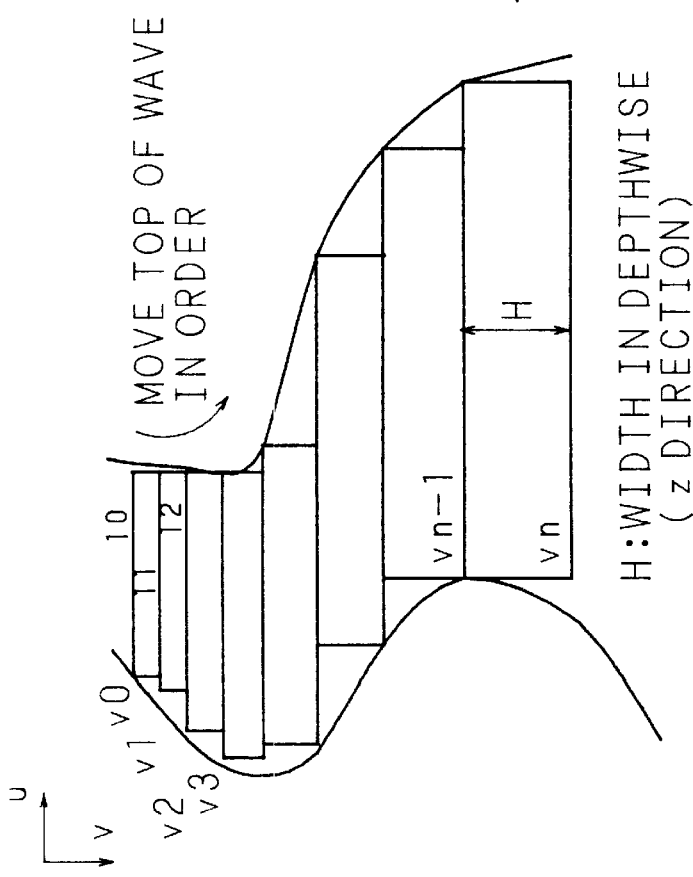

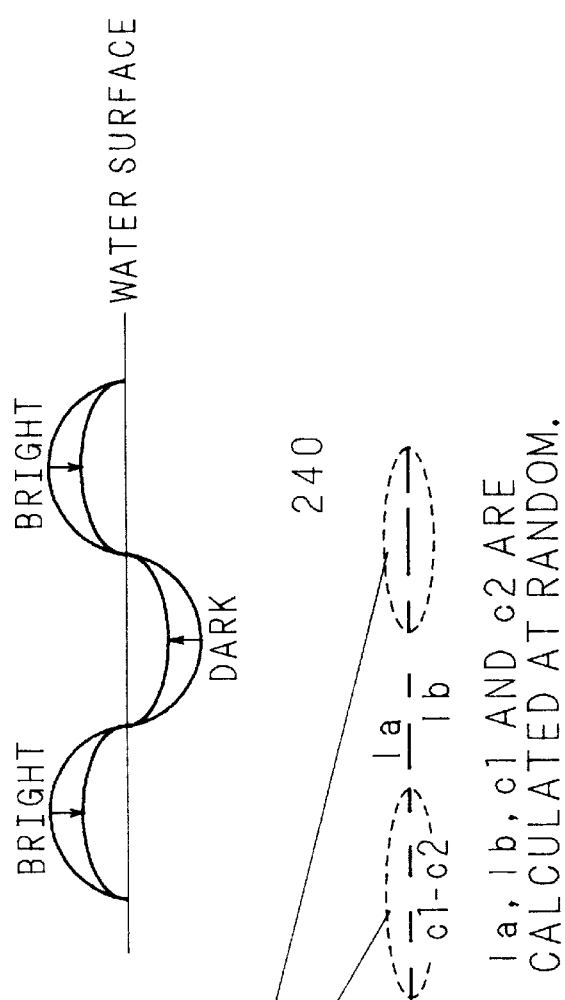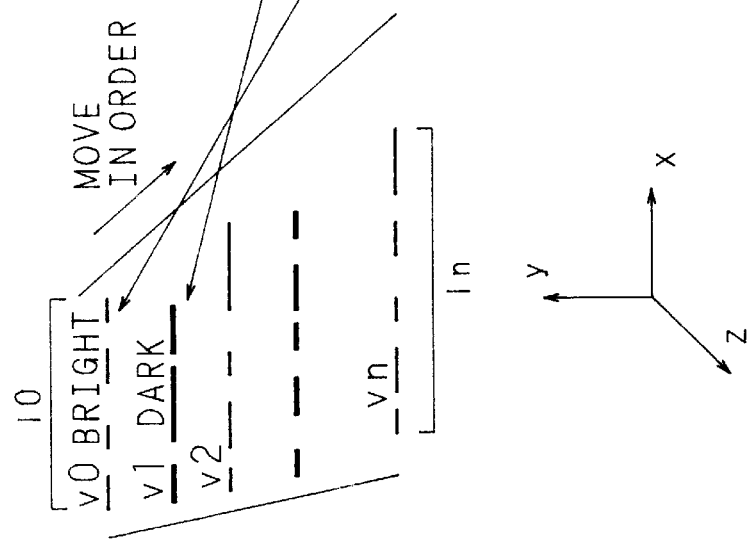

METHOD AND APPARATUS FOR CREATING IMAGE AND COMPUTER MEMORY PRODUCT

BACKGROUND OF THE INVENTION

1. Field of the Invention

The present invention relates to an image creating apparatus for creating a variety of images for expressing a variety of objects on a two-dimensional plane.

2. Description of the Prior Art

In recent years, there has arisen a requirement for a method of interaction between a human being and a computer, such as a man-machine interface or human interface. Thus, an intuitive interactive method using the five senses of a human being on the basis of techniques, such as artificial reality (AR) and virtual reality (VR), has been realized. Also, in the field of personal computers, there have been realized structures typified by computer games having high speed image creation and animation functions and enabling images to be changed in accordance with the operation performed by a human being. Also, information processing apparatuses, such as personal computers for home use, have been enabled to create and display a high-quality dynamic image by using computer graphics, thanks to improvement in performance. A further improvement in the quality of an image which is displayed has been required.

Since the performance of the computer system has been improved, an artificial creature composed of independent object groups has been considered feasible to be created. Moreover, an attempt has also been made to realize a world in a computer in which the artificial creature lives. An image creating apparatus for displaying an image of the motion of an artificial creature of the foregoing type has been disclosed by the inventors of the present invention (refer to U.S. Ser. No. 08/369,110). The foregoing image creating apparatus inputs a motion pattern which is considered and required by the artificial creature as a command. In accordance with the command, required images are selected from a multiplicity of image patterns to create and display a continuous image. Thus, the motion of the artificial creature can be visualized and a virtual experience can be realized. The foregoing image creating apparatus converts image data expressed with three-dimensional coordinates into two-dimensional coordinates in accordance with three-dimensional image data obtained from a variety of photographed objects including an artificial creature thereby to create an image which is displayed on a two-dimensional screen.

To enable the image creating apparatus of the foregoing type to move the artificial creature in various environments to display the motion of the artificial creature like an actual creature to provide further improved reality to a viewer, an image must be created which is capable of expressing a variety of factors including other artificial creatures, natural objects and background as well as the subject artificial creature as if they were seen by the eyes.

For example, a soft wind, rain, an action of a bird or fish, and the like, causes ripples, sway, wave or spray to be generated on the water surface of an actual lake, pond, or the like. Moreover, the water surface reflects plants and buildings existing on the shore. In addition, an image of a bird flying in the sky is sometimes reflected on the water surface. If the computer graphics is able to display a created image of the water surface having the above-mentioned movements, reality can be given to the whole image.

However, it is difficult for the improved performance of the present personal computer to create a dynamic image in real time while simulating the foregoing movements. In particular, when a dynamic image of a type expressing an object, such as an artificial creature or a character of a computer game, moving on a background image including the water surface is displayed, the dynamic image must be created in real time to follow an indefinite movement of the object.

BRIEF SUMMARY OF THE INVENTION

An object of the present invention is to provide a method and an apparatus which are capable of preventing creation of an unnatural image and creating a variety of images for expressing various objects on a two-dimensional plane with satisfactory reality.

Another object of the present invention is to provide a method and an apparatus for creating an image which are capable of displaying states of delicate movements of a water surface, shadows created by the objects and waves in real time with satisfactory reality.

Another object of the present invention is to provide a method and an apparatus which are capable of displaying an object reflected on a water surface, a beam radiated from a spot lighting source and a semitransparent object in real time with satisfactory reality.

According to a first aspect of the present invention, there is provided an image creating apparatus, comprising: means for inputting an image to be processed and information for defining a region of a water surface included in the image to be processed, and creating a plurality of slice regions by dividing, into a predetermined direction, the region in the image to be processed which has been defined in accordance with water surface region information; means for generating a sway width for each of the divided slice regions; and means for overwriting the slice regions on the image to be processed in such a manner that each of the slice regions is swayed by the generated sway width in the direction of division.

The first aspect of the present invention is arranged in such a manner that the water surface is divided into elongated (or vertical) slice regions, and the slice regions are swayed in the lateral direction (or the vertical direction) with random widths. The image to be processed is a dynamic image. When the image is, for each frame (or periodically or for each of predetermined frames) input to the image creating apparatus, the slice region is swayed with each of new sway width and the image is drawn. Thus, a stationary sway (wave) of a water surface can be expressed.

According to a second aspect of the present invention, there is provided an image creating apparatus, comprising: detection means for inputting position information of an object which moves on a background image and information for setting a range in which the object affects on the water surface in the background image, and detecting a fact that the position of the object has been introduced into the range in which the water surface is affected; means for creating a plurality of slice regions by dividing, into a predetermined direction, an image adjacent to the object when detection has been performed by the detection means; means for generating a sway width for each of the divided slice regions; and means for overwriting the slice regions on the background image in such a manner that each of the slice regions is swayed by the generated sway width in the direction of division.

The second aspect of the present invention is structured such that the sway of the water surface caused by the object can be expressed. Moreover, drawing which is swayed for each slice region is repeated periodically (or for each of predetermined frames) so that sway of the water surface is drawn. It is preferable that the sway width according to the second aspect be larger than that according to the first aspect. The reason for this is that the second aspect arranged to express the sway caused by the object requires greater motion rather than simple wave.

According to a third aspect of the present invention, there is provided an image creating apparatus, comprising: means for creating a plurality of slice regions by dividing a shadow pattern, which has been created, into a predetermined direction; means for generating a sway width for each of the divided slice regions; and means for overwriting the slice regions on a portion adjacent to an object drawn on an image to be processed in such a manner that each of the slice regions is swayed by the generated sway width in the direction of division.

The third aspect of the present invention is arranged to express a shadow generated by an object of a type which is floating on the water surface. Also the third aspect is arranged to perform random sway for each slice region periodically or for each of predetermined frames. Thus, a state where the shadow is delicately moved can be expressed.

According to a fourth aspect of the present invention, there is provided an image creating apparatus, comprising: means for calculating the position at which an object which will be drawn on an image to be processed is reflected on a water surface in accordance with position information of the object and position information of the water surface included in the image to be processed; means for creating a plurality of slice regions by dividing a shadow pattern, which has been created, into a predetermined direction; means for generating a sway width for each of the divided slice regions; and means for overwriting the slice regions on the reflection position in such a manner that each of the slice regions is swayed by the generated sway width in the direction of division.

The fourth aspect is arranged to draw a shadow created by an object existing on water and a shadow created due to reflection of an object diving in water. Sway of the divided slice regions at the reflection position is randomly repeated periodically or for each of predetermined frames so that a state where the shadow is delicately moved is expressed.

When the shadow is moved in the third aspect or the fourth aspect, it is preferable that the shadow be deformed in accordance with the direction in which the shadow is moved. The reason for this is that the state of movement of the shadow to follow the movement of the object must be expressed. Although the shadow is not actually deformed attributable to the moving direction of the object which is irradiated with light, the object of the present invention is to obtain an effect of display rather than accurate simulation of a real world. Therefore, it is preferable that the sway generating means corresponds to the movement vector of the object to add the sway width to deform the shadow in accordance with the moving direction of the object.

According to a fifth aspect of the present invention, there is provided an image creating apparatus, comprising: means for detecting a fact that an object which will be drawn on an image to be processed has passed through a water surface included in the image to be processed in accordance with present position information of the object, position information of the object before a predetermined period of time and position information of the water surface included in the image to be processed; means for calculating the coordinates of the center of an ellipse to be drawn in accordance with position information of the object and/or position information of the object before the predetermined period of time and position information of the water surface; determining means for determining the size of the ellipse to be drawn; and ellipse drawing means for overwriting the ellipse on the image to be processed in accordance with the calculated coordinates of center and the determined size; wherein the ellipse drawing means repeats drawing plural times and the determining means determines the size in such a manner that ellipses which will be drawn later have larger sizes.

The fifth aspect is arranged such that the ellipses are displayed large for each frame to express the ripples. Since the ellipse drawing means performs drawing by copying the colors of pixels adjacent to pixels of the ellipse to be drawn in such a manner that ellipses which will be drawn later have pixels to be copied and pixels to be drawn, the distance between which is shortened. Thus, the color of the pixels in the ellipse which is generated first is considerably different from the color of adjacent pixels. Moreover, the color of the pixel of the ellipse which is generated later is gradually made to be the same as the color of the adjacent pixels. Thus, the color is made to be gradually made to be the same as the adjacent water surface portion in a state where the ellipses are enlarged. Thus, a real image like ripples which are generated on an actual water surface can be created. Moreover, the ellipse drawing means performs overwriting in such a manner that a plurality of ellipses each having center slightly deviated from the center calculated by the ellipse center calculating means. Thus, the heights of the ripples can be expressed. Thus, an image of more real ripples can be created.

According to a sixth aspect of the present invention, there is provided an image creating apparatus, comprising: dividing means for dividing a region of a water surface included in a two-dimensional image created by projecting a virtual three-dimensional space from a predetermined viewpoint into a plurality of regions; and elongating means for elongating the plurality of the divided regions in a direction of the height on the virtual three-dimensional space; wherein the elongating means periodically elongates the regions in the direction of the height on the corresponding virtual three-dimensional space in the sequential order of the depth on the virtual three-dimensional space.

The sixth aspect is arranged to express a state where waves sequentially stand from a deep position of the water surface toward this side or from this side to a deep position so that a state where waves surge (or move away from this side) is expressed. The "two-dimensional image created by projecting a virtual three-dimensional space from a predetermined viewpoint" is determined on the assumption that a simulation of an object which moves in the virtual three-dimensional space is performed and the result of the simulation is displayed on the two-dimensional image. However, the present invention is not limited to this. A structure is not restricted in which the present invention is applied to a region of a water surface included in a simple stereoscopic (three-dimensional) picture drawn and displayed on a two-dimensional image. The foregoing fact is applied to the seventh to ninth aspects of the present invention.

According to a seventh aspect of the present invention, there is provided an image creating apparatus, comprising: means for setting an initial position of a plurality of lines in the direction of the depth in order to set a plurality of lines on which waves are drawn on a region of a water surface included in a two-dimensional image created by projecting a virtual three-dimensional space from a predetermined viewpoint; means for setting control data for setting pixels for displaying the colors of waves different from the colors of the water surface and pixels for as it is displaying the colors of the water surface for each of the plurality of lines; means for setting the sway width between the positions at which the plural lines are drawn and the initial position; and drawing means for drawing the pixels at the positions at which the lines are drawn and set by the control data setting means in the colors of the waves; wherein the sway width is changed at each drawing timing, and the drawing means performs drawing.

The seventh aspect is arranged to express a state where waves sequentially surge. When the color for one line is alternately displayed in colors brighter than those of the water surface and colors darker than those of the water surface at each display timing (periodically or for each of predetermined frames), further satisfactory reality can be realized.

It is preferable that the sixth aspect is applied to a water surface near a virtual viewpoint. It is preferable that the seventh aspect is applied to a water surface distant from the virtual viewpoint.

According to an eight aspect of the present invention, there is provided an image creating apparatus, comprising: means for setting, in a region of the water surface in the image to be processed, coordinates at which sprays are randomly generated; means for displaying images of sprays which have been created, at the coordinates; and means for drawing ellipses around the coordinates, the ellipses being enlarged periodically or for each of predetermined frames.

The eighth aspect is able to effectively display sprays and ripples generated due to drop of rain.

According to a ninth aspect of the present invention, there is provided an image creating apparatus, comprising: means for setting a plurality of regions for expressing sprays of a rain on a region of a water surface included in a two-dimensional image created by projecting a virtual three-dimensional space from a predetermined viewpoint; means for setting control data for setting pixels for displaying the colors of waves different from the colors of the water surface and pixels for as it is displaying the colors of the water surface for each of lines corresponding to the plurality of the regions; means for randomly setting the positions at which the lines are drawn in the range of the regions; and means for drawing the pixels at the positions at which the lines are drawn and set by the control data setting means in the colors of the waves.

The ninth aspect is arranged to randomly determine positions to which water drops and express a state where rain drops on the water surface.

It is preferable that the eighth aspect is applied to a water surface near the virtual viewpoint. It is preferable that the ninth aspect is applied to a water surface distant from the virtual viewpoint.

An image creating apparatus according to a tenth aspect of the present invention is arranged to use existing image data of an object and existing image data of a water surface to create an image in a two-dimensional plane in a state where the object is reflected to the water surface. The coordinates of the position at which the object is projected to the water surface are obtained. Moreover, the image of the object is reduced in the vertical direction and then inverted vertically. A color obtained by synthesizing the color of water and the color of the object is used to display the edited image at the obtained coordinate position. Thus, an object reflected to a water surface can be expressed with satisfactory reality by a simple method.

When the image of the water surface is divided into a plurality of slice regions and the slice regions are swayed with random widths, the swayed slice regions can be displayed. Thus, the constant sway of the water surface can be expressed and thus further satisfactory reality can be realized.

In accordance with the height from the water surface, the ratio of color mixture of the color of water and color of the object is changed. That is, if the object is near the water surface, the mixture ratio of the color of the object is raised. If the object is distant from the water surface, the mixture ratio of the color of water is raised. As a result, the image of the object reflected to the water surface is clearly displayed in a case where the object is near the water surface. If the object is distant from the water surface, the image of the object reflected to the water surface is displayed dimly. Thus, the reality can furthermore be improved.

An image creating apparatus according to an eleventh aspect of the present invention is arranged to use existing image data of a beam radiated from a spot lighting source and existing image data of a background to create an image of a state on a two-dimensional plane in which the background is irradiated with the beam radiated from the spot lighting source. When image data of the beam radiated from the spot lighting source is stored, also brightness information of each pixel indicated with a plurality of gradations is stored. When the color is determined by mixing the color of the beam and the color of the background, the mixture ratio is controlled in accordance with brightness information. That is, the mixture ratio of the color of the beam is raised in the portion having high brightness. The mixture ratio of the color of the background is raised in the portion having low brightness. Thus, a glare light image can be emphasized in a region near the spot lighting source. On the other hand, a transparent image in which the background is viewed through dim beams can be expressed in a region distant from the spot lighting source. Thus, an image having the real relationship between the spot lighting source and the background can be expressed with a simple method. Brightness information of pixels indicated with a plurality of gradations of the beam may be used to raise the brightness of only the background irradiated with the beam to display an image having real relationship between the spot lighting source and the background.

An image creating apparatus according to a twelfth aspect of the present invention is arranged to use existing data of a first object and a second object to create an image of a synchronous state of the two objects with time on a two-dimensional plane. At the timing at which existing image data indicating a specific motion state of the first object is read, existing image data indicating a specific motion state of the second object is read so that an image formed by synthesizing two image data items is displayed. Thus, an image formed by synchronizing the specific motion of the first object and the specific motion of the second object can be created and displayed with a simple method.

An image creating apparatus according to a thirteenth aspect is arranged to use existing image data of a semitransparent second object and existing image data of a first object which is not semitransparent to create an image on a two-dimensional plane in a state where the first object and the second object are superimposed. The superimposition relationship between the first object and the second object is judged. If the second object is positioned more forwards, the two objects are displayed in a color obtained by mixing the colors of the two objects to express the semitransparent image. If the first object is positioned more forwards, only the first object is displayed and a state where the second object is hindered by the first object is expressed. As a result, semitransparent objects, such as rainbow and fog, can be expressed with satisfactory reality with a simple method. When a color is determined by mixing the color of the first object and the color of the second object, the mixture ratio of the colors is controlled in accordance with the region of the second object. That is, the mixture ratio of the color of the second object is raised in the central portion of the second object. Moreover, the mixture ratio of the color of the second object is lowered toward the periphery portion. Thus, display in which the periphery is dimmed can be performed. Thus, further real display can be performed.

The above and further objects and features of the invention will more fully be apparent from the following detailed description with accompanying drawings.

BRIEF DESCRIPTION OF THE SEVERAL VIEWS OF THE DRAWINGS

FIG. 21 is a diagram showing waves which are drawn in the sixth embodiment;

FIGS. 24A and 24B are diagrams showing waves which are drawn in the seventh embodiment;

DETAILED DESCRIPTION OF THE INVENTION

Embodiments of the present invention will now be described with reference to the drawings.

Initially, a presupposition of the following embodiments will be described. In each of the following embodiments, a projection is created which is obtained by looking at virtual three-dimensional X-Y-Z coordinates from a certain viewpoint, the projection being displayed on a two-dimensional plane. Therefore, an object existing in the three-dimensional space is converted into two-dimensional U-V coordinates so as to be displayed. If a position of the viewpoint on the virtual three-dimensional space is determined, the known method may be employed to convert the three-dimensional coordinates (X, Y, Z) into the two-dimensional coordinates (U, V).

Since an artificial creature, the water surface, trees, mountains and the like existing in the three-dimensional space are actually displayed on the two-dimensional plane, their positional relationship (the direction of the depth of the screen) must be considered when an image, which must be displayed, must be created. Accordingly, two-dimensional image data obtained by converting three-dimensional image data obtained by actual photography in accordance with the three-dimensional coordinates is prepared. Two-dimensional image data stores Z-value (a values indicating the direction of the depth such that larger values indicate front positions) of all of objects to be displayed. When a plurality of objects are displayed on a two-dimensional plane by using two-dimensional image data, their Z-values are subjected to a comparison to consider the relationship of the direction of the depth of the objects. As for the process using the Z-values, refer to the patent application filed by the inventors of the present invention (U.S. Ser. No. 08/633, 533).

In the first to eighth embodiments, the water surface included in an original image (corresponding to "image to be processed" in the claims) is expressed such that all pixels are not displayed with the same colors. The water surface is expressed such that a state in which a building and the like are reflected is drawn. If nothing is reflected, the color is precisely changed for each pixel to express the reality of the water surface.

First Embodiment: Display of Constant Sway of Water Surface

Figure 1:
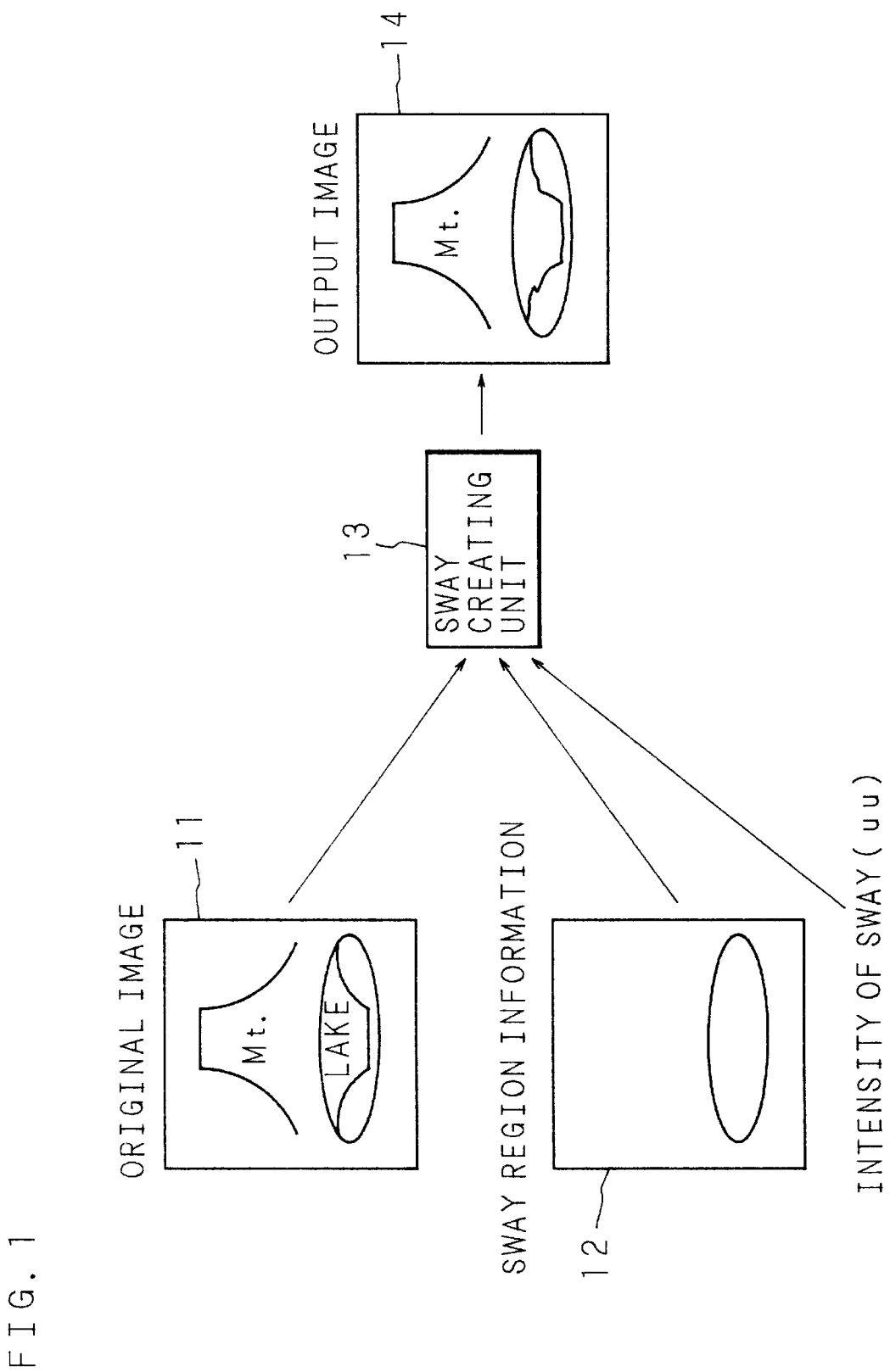
FIG. 1 is a block diagram showing the structure of a first embodiment.

FIG. 1 is a diagram showing the structure of a sway creating device. An original image 11 is an example of an image displayed in this embodiment, the original image 11 being a scene having a mountain and a lake to which the mountain is reflected. The mountain and the sky at the back of the mountain are still images or dynamic images free from rapid change, such that the colors are changed as the time elapses and/or the weather changes and/or the clouds are slowly shifted. The lake, which is the water surface, is displayed with precise sway, and a further improved reality is expressed.

To achieve this, sway region information 12, for defining a region in the original image in which the sway is generated, and intensity (maximal sway width) uu of the sway to be expressed are supplied to a sway creating unit 13. Sway region information 12 defines the region of the water surface corresponding to the original image 11, sway region information 12 being previously prepared in this embodiment to define the portion corresponding to the surface of the lake. Note that the original image 11 and the sway region information 12 are two-dimensional images in U-V coordinate system (U indicates the vertical coordinate and V indicated the horizontal coordinate).

Figure 2:
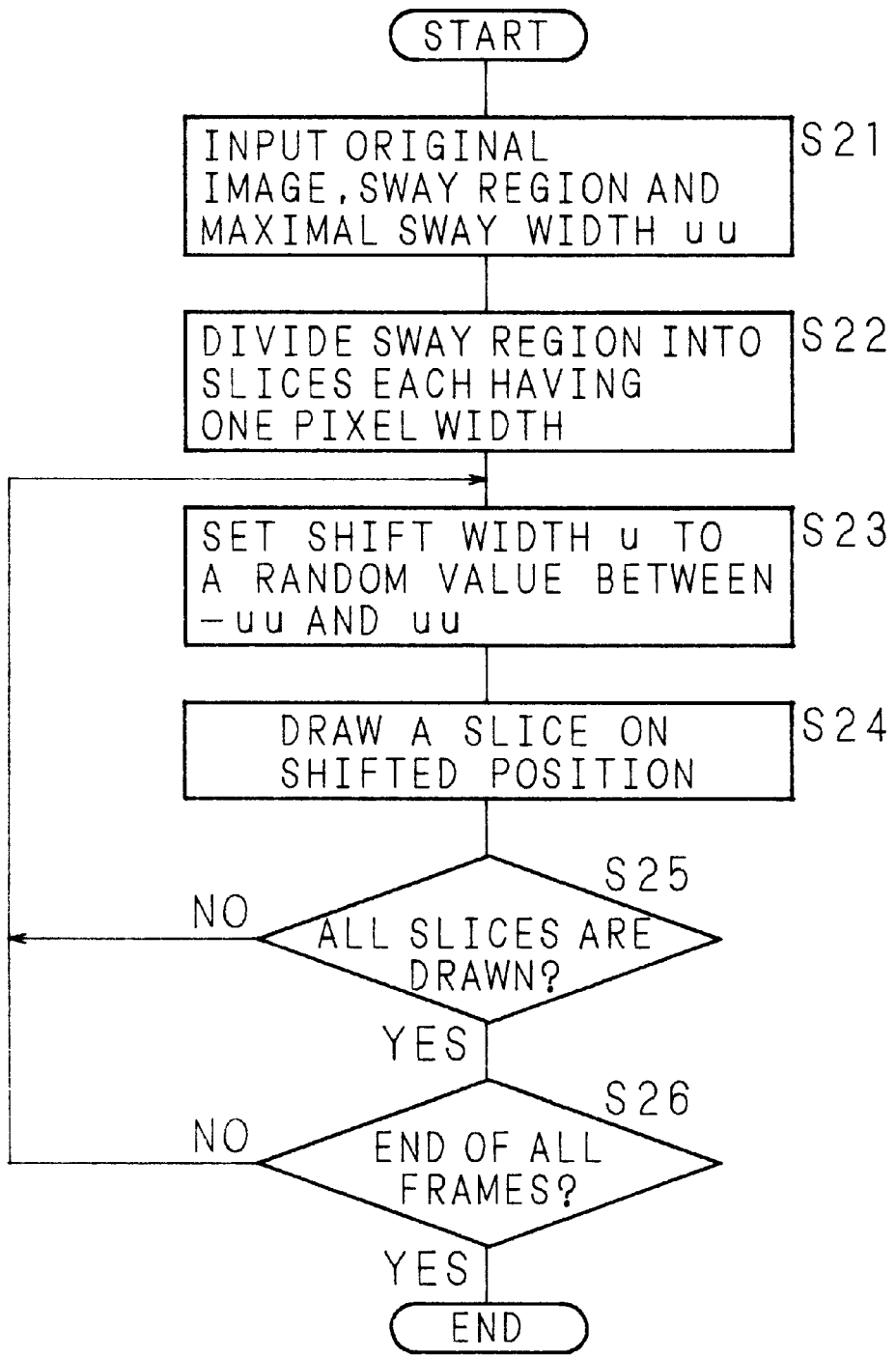
FIG. 2 is a flow chart of the process according to the first embodiment.

The sway creating unit 13 executes the operation shown in the flow chart in FIG. 2, so that sway is given to the region of the original image 11 defined by the sway region information 12. The process shown in FIG. 2 will now be described.

As described above, the original image 11, the sway region information 12 and the maximal sway width uu are input (S21). The region of the original image 11 defined with the sway region information 12 is taken by cutting so as to be divided into elongated regions (which are called "slices") having a width of one pixel (S22). An example of the slices will now be described with reference to FIG. 3.

Figure 3A:
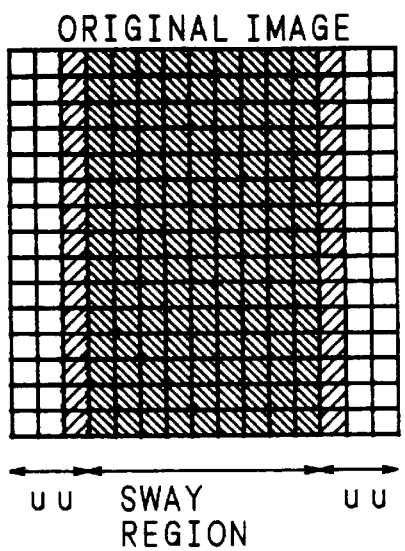
FIGS. 3A to 3D are diagrams showing a process for swaying a slice.
Figure 3B:
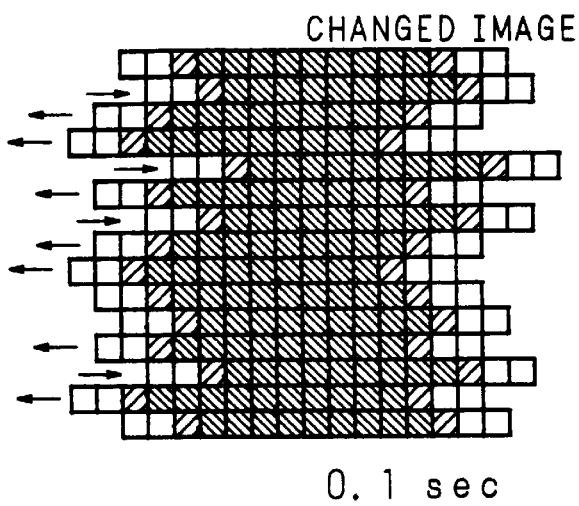
Figure 3C:
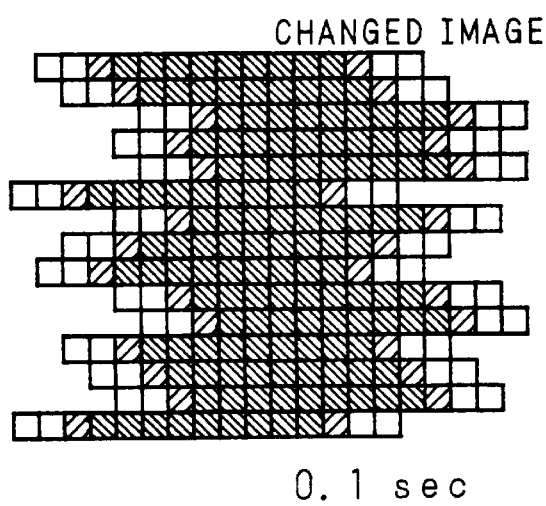
Figure 3D:
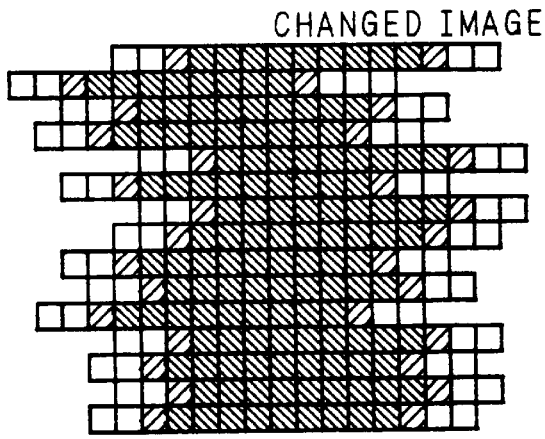

FIG. 3A shows the sway region of the original image and a portion (a region wider in the horizontal direction by the sway width uu) adjacent to the sway region. Each of the slices of the original image is subjected to processes in S23 to S25 for each frame of the dynamic image or periodically (at intervals of 0.1 second in the embodiment shown in FIG. 3) so that sway images shown in FIGS. 3B to 3D are created (S26). Referring back to FIG. 2, the repeated process in S23 to S25 will be described.

Initially, sway width u is generated in the form of random numbers in a range from −uu to uu (S23). Then, an image is drawn at a position swayed by generated sway width u (S24). After the processes in S23 and S24 have been completed, the following slices are subjected to similar processes so that images of all slices are drawn (S25).

In actuality, the same values as those of the pixels of the original image are drawn in the pixels expressed as blanks as a result of the sway shown in FIGS. 3B to 3D.

Figure 4:
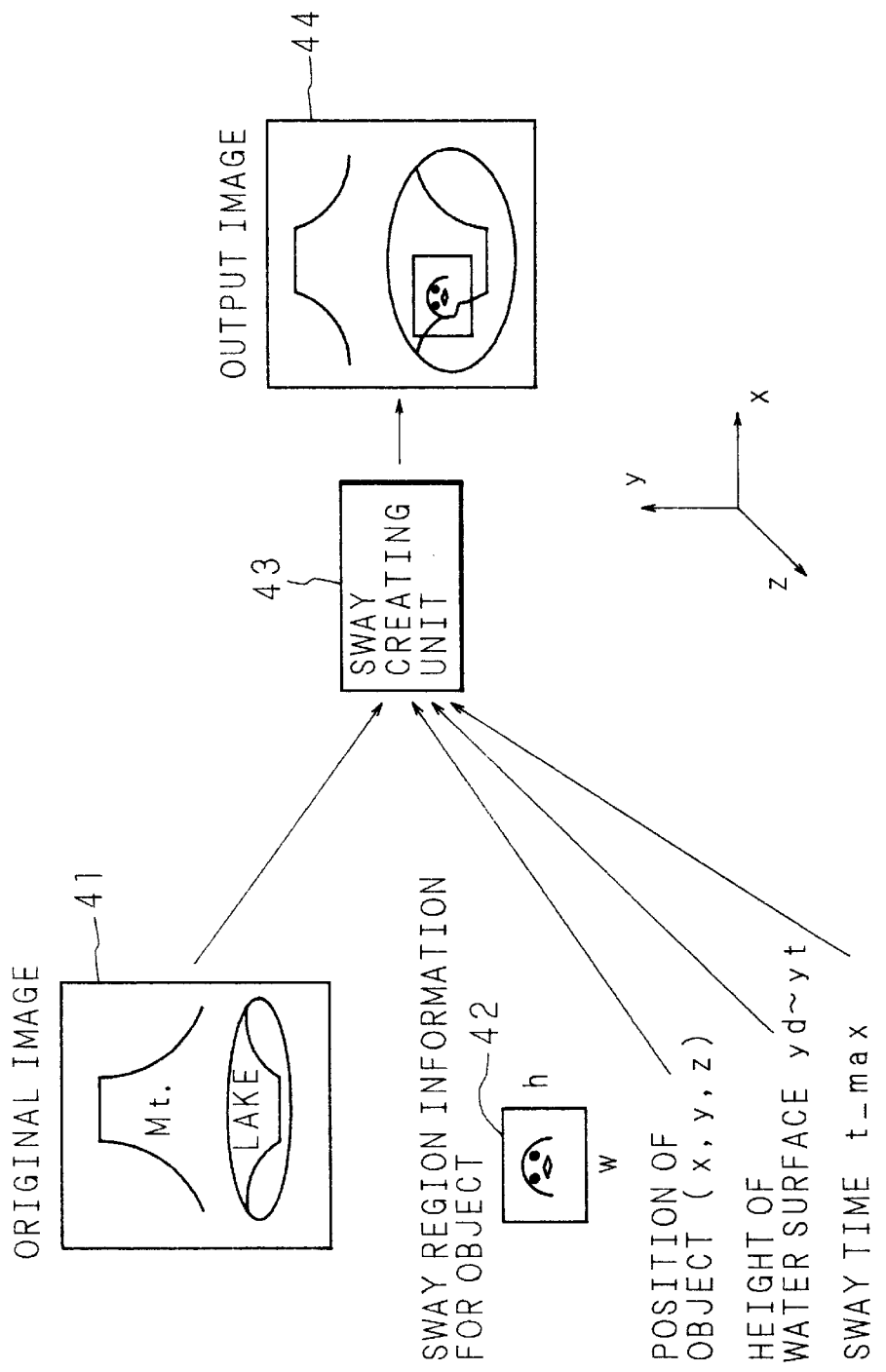
FIG. 4 is a block diagram showing the structure of a second embodiment.

Second Embodiment: Display of Disorder of Water Surface Owing to Introduction of Object FIG. 4 is a diagram showing the structure of a sway creating device according to a second embodiment. Reference numeral 41 represents an original image. Although the original image 41 may be a still image, it may be an image subjected to the process of creating sway of the water surface according to the first embodiment. It is preferable that a sway region defined by object sway region information 42, to be described later, be subjected to a process shown in FIG. 5. On the other hand, a sway region (corresponding to sway region information 12 according to the first embodiment and omitted in FIG. 4) of the water surface, except for the region defined by the object sway region information 42, is subjected to the constant sway creating process according to the first embodiment.

Object sway region information 42 defines a range affecting the water surface in a case where, for example, an object moving on the original image 41 as the background dives into water through the water surface of the original image 41. The original image 41 and an output image 44 are, similarly to the first embodiment, expressed in the U-V coordinate system (two-dimensional coordinate system). The U-V coordinate system is arranged such that a virtual three-dimensional space (the three-dimensional coordinate system) indicated by (x, y, z) is expressed as an image viewed from a viewpoint on this side. The object is calculated such that it moves in the three-dimensional space and displayed such that the coordinate position of the object on the three-dimensional space is converted into the U-V coordinate system and then superimposed on the original image so as to be displayed. In this case, the size of the displayed object changes to correspond to the depth z in the virtual three-dimensional space. If the object is positioned on this side, the size is enlarged. If the object is positioned deeply, the size is reduced. Also, object sway region information 42 is prepared to correspond to the object, the maximal value (w, h) in the U-V coordinate system. Then, the actual sway region is changed to correspond to the display size of the object.

Figure 5:
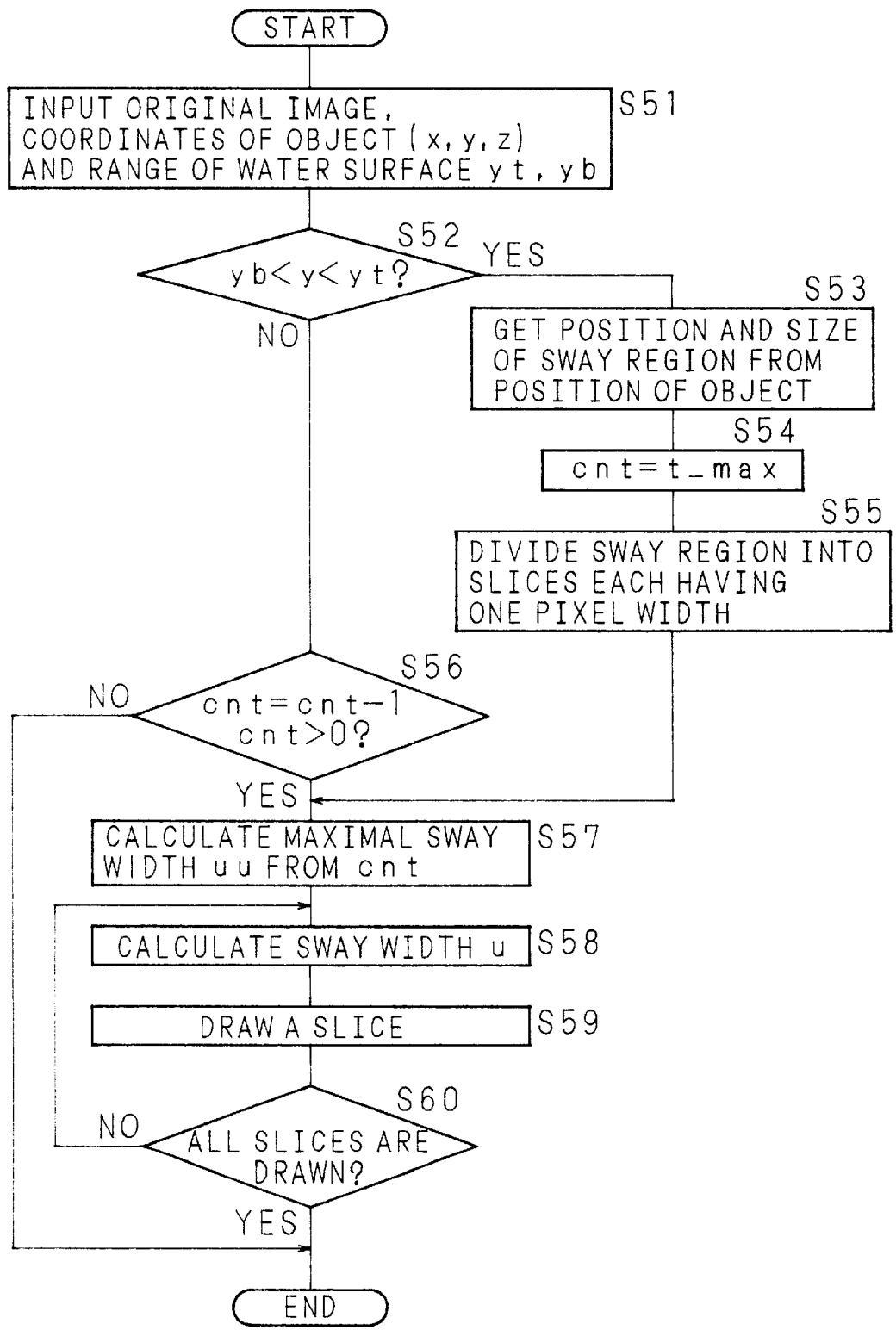
FIG. 5 is a flow chart showing the process according to the second embodiment.

The sway creating unit 43 executes the operation shown in the flow chart in FIG. 5 so as to output the output image 44. The foregoing process will now be described with reference to FIG. 5. Initially, the original image 41, the coordinates (x, y, z) on the virtual three-dimensional space of the object to be displayed and height ranges yt and yb (which are previously determined to be adaptable to the original image) of the water surface considered to be affected by the object are input (S51).

Then, whether or not y coordinate of the object on the virtual three-dimensional space is in a range from yt to yb is detected (S52). If the y coordinate is in the above-mentioned range, a region, in which the sway is created, is determined in accordance with the position (obtained by converting the position (x, y, z) on the virtual three-dimensional space) of the object in the U-V coordinate system (S53). The size of the region is processed as described above in such a manner that the size is enlarged when the object is positioned on this side and the same is reduced when the object is positioned at a long distance in accordance with position z of the object on the virtual three-dimensional space.

Then, count value cnt is set to a predetermined sway time t_max (S54). The sway time t_max is used to previously define a period of time for which sway is retained because influence (sway) of the object on the water surface is considered to be retained for a certain period of time. The count value cnt is subtracted for each frame. When cnt=0 is satisfied, no sway is displayed (S56).

The region of the original image determined in S53 is divided into elongated slices each having a width of one pixel as described in S22 according to the first embodiment and referring to FIG. 3 (S55). Then, the maximal sway width uu is determined (S57). It is preferable that the initial sway width uu be larger than the sway width according to the first embodiment. The reason for this is that the second embodiment is structured to express the sway greater than constant sway occurring when, for example, a bird or a fish makes ripples as compared with the first embodiment in which constant and small sway is expressed.

The maximal sway width uu which is provided in this process is changed in accordance with the count value cnt. In general, the value of uu is reduced in proportion to the value of cnt. Thus, a state of generation of sway width and the same is attenuated. The sway width u which is provided for each slice is calculated as a random number in the range from −uu to uu (S58), and then an image is drawn at the position of the slice deviated by u in the horizontal direction (S59). The drawing process is performed similarly to that shown in FIG. 3. Then, whether or not all of the slices have been drawn is determined (S60), and then S58 and S59 are repeated.

If the object is not in the range from yb to yt (NO in S52) and decreased cnt is not zero (YES in S56), t_max does not taken from generation of sway and therefore the residual sway must be displayed in this period of time. Therefore, the sway is drawn by performing processes in S57 to S59.

Figure 6:
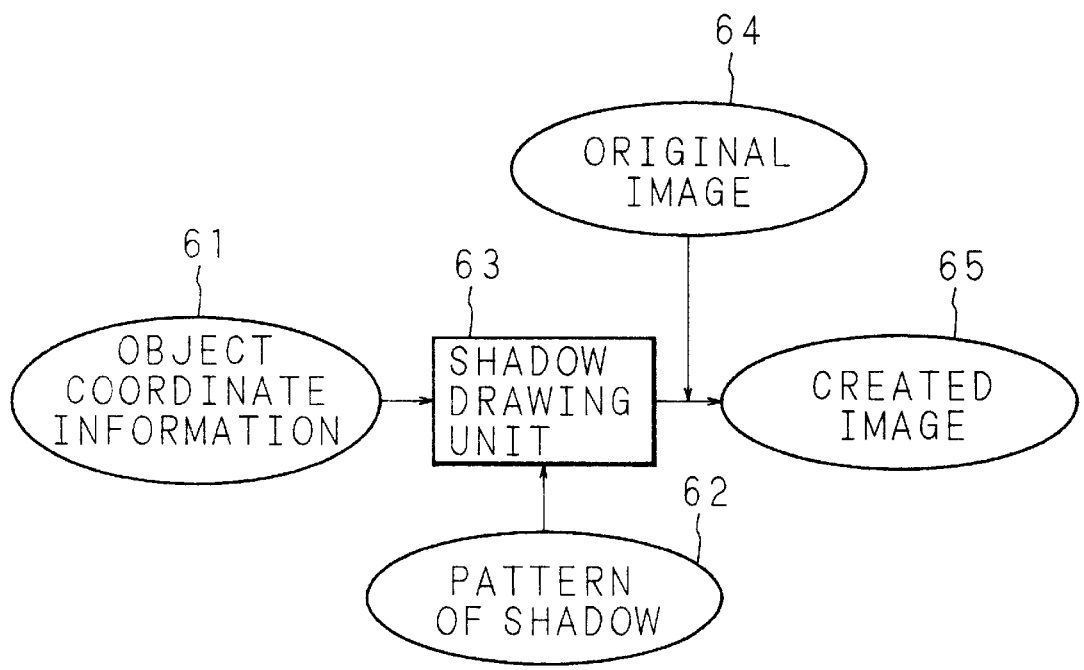
FIG. 6 is a block diagram showing the structure of third and fourth embodiments.

Third Embodiment: Creation of Shadow Formed by Object Moving on Water Surface FIG. 6 is a block diagram showing the structure of a shadow drawing device. In this embodiment, the shadow generated by an object which moves on the water surface is displayed with reality. Reference numeral 61 represents coordinate information of the object obtained by converting the position (x, y, z) of the object which moves on the water surface on the virtual three-dimensional space into coordinates (u0, v0) on the U-V coordinate system which is the two-dimensional coordinate system for a displayed image. Since the value y (that is, the height in the virtual three-dimensional space) of the water surface in the original image has been determined, determination of values x and z enables conversion to coordinates on the two-dimensional coordinate system in accordance with the position of a virtual viewpoint. Also movement vector (ud, vd) of the moving object and sway width w0 of the object which is displayed on the U-V coordinate system are included in object coordinate information 61.

Figure 7:
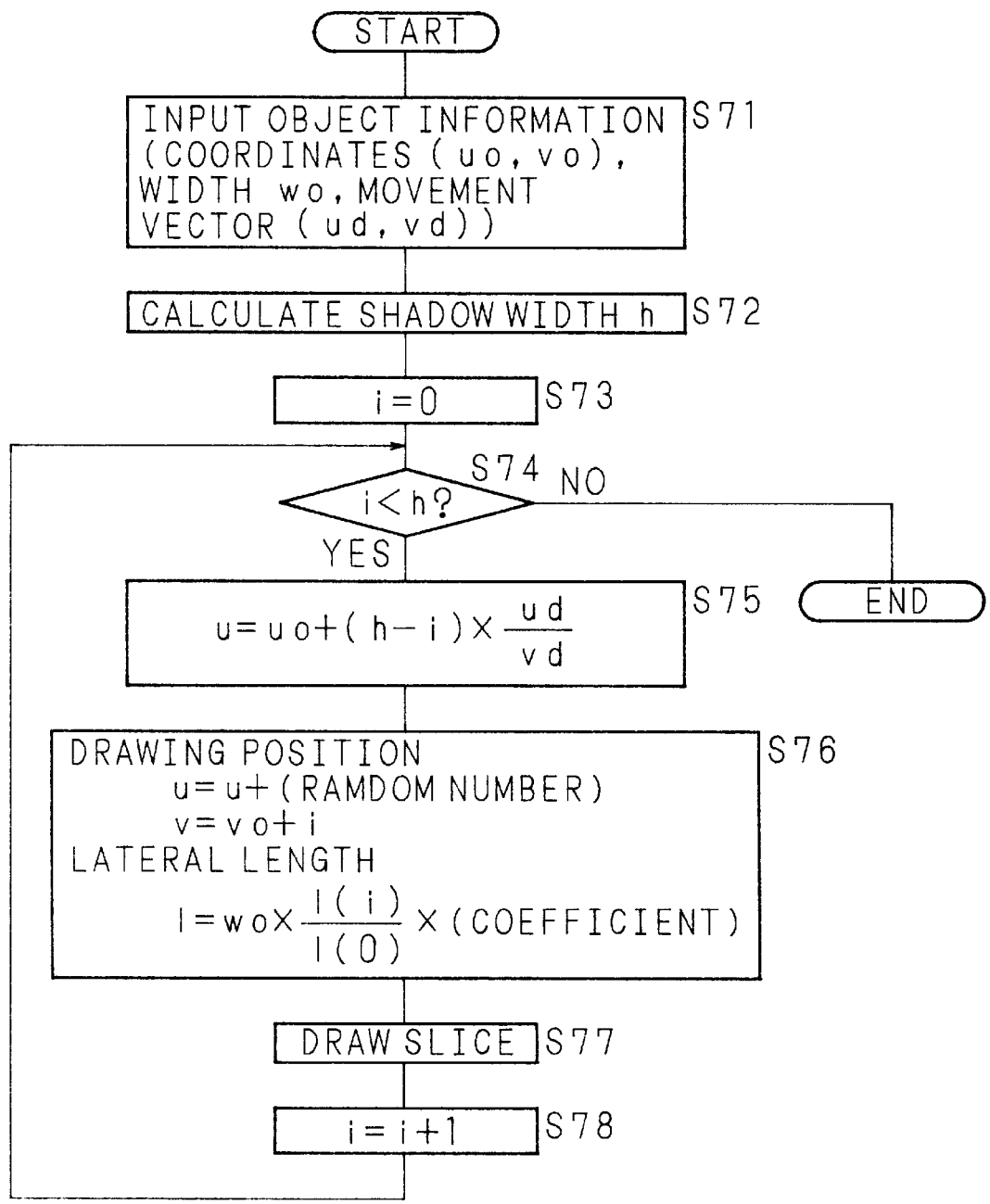
FIG. 7 is a flow chart showing the process according to the third embodiment.
Figure 8:
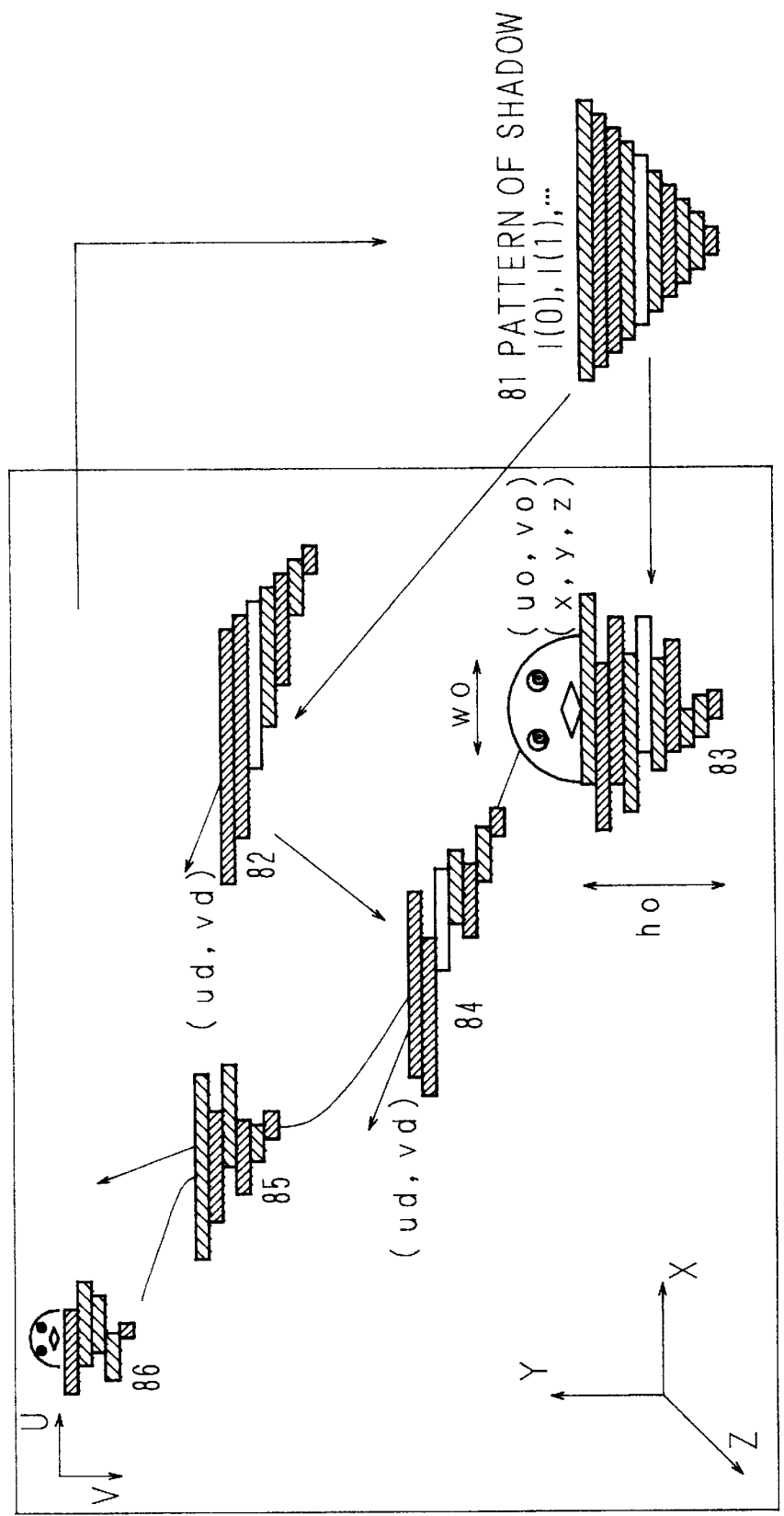
FIG. 8 is a diagram showing creation of a shadow according to the third embodiment.

Reference numeral 62 represents a pattern of the shadow. The pattern 62 is previously produced to have a substantially isosceles triangle and formed by an elongated region (a slice) having a width of one pixel, as pattern 81 shown in FIG. 8. The uppermost slice has the longest length and the length is shortened in the descending order. Note that the pattern 81 is drawn in such a manner that the color is made to be different for each slice in order to cause a process for shifting the slice, which will be described later, to easily be understood. In actual, the color is not different for each slice. When the color of the shadow is created by using a dark portion in the background water portion as a reference, a natural tone can be realized. A shadow drawing unit 63 deforms the pattern 62 of the shadow in accordance with object coordinate information 61, and then draws the deformed shadow on an original image 64 so as to create an image 65. The operation of the shadow drawing unit 63 will now be described with reference to FIG. 7.

Initially, object coordinate information 61 is input (S71). Then, the shadow width h (the number of the slices) is calculated by multiplying the object width w0 by a predetermined coefficient (S72). Then, initial value 0 is set to count value i to subject the obtained number of slices to a deforming process (S73). If the count value i is smaller than h (YES in S74), the following processes in S75 to S78 are performed.

When lateral movement is performed, that is, when ud is not zero, each slice is shifted to deform the shadow to be adaptable to the moving vector. To enlarge the amount of movement in the descending order of the slices, the ud/vd is multiplied by the value i and the result of the multiplication is added to the original coordinate value u0 (S75). The thus-deformed shadow is shown as 82 shown in FIG. 8.

Then, the position u at which the slice is drawn is shifted by adding an arbitrary random number generated to have a value in a predetermined range. The vertical position v at which the slice is drawn is made to be a value obtained by adding the value i to the object displayed position v0. The length of the slice is made to be a somewhat long value (by multiplying a predetermined coefficient) to correspond to the length of the object (S76). The slice is drawn at the obtained drawing position (S77), and the value i is increased (S78). Thus, h slices are drawn so that the shadow is drawn. An example of the thus-created shadow is indicated as 84 shown in FIG. 8. The foregoing shadow is obtained by moving the still object 83 into the direction of the vector (ud, vd).

The foregoing process is repeated for each frame. Since a random number is provided for each slice even in the still state 83 (ud=0, vd=0), delicate sway of shadow can be expressed. When the object is moved into the direction of the depth (in the z direction) on the virtual three-dimensional space, the size of the shadow is reduced as indicated by 85 and 86. This process corresponds to the reduction of the size w0 of the object performed in S71.

Fourth Embodiment: Creation of Shadow Owing to Object in the Sky and Water

Figure 9:
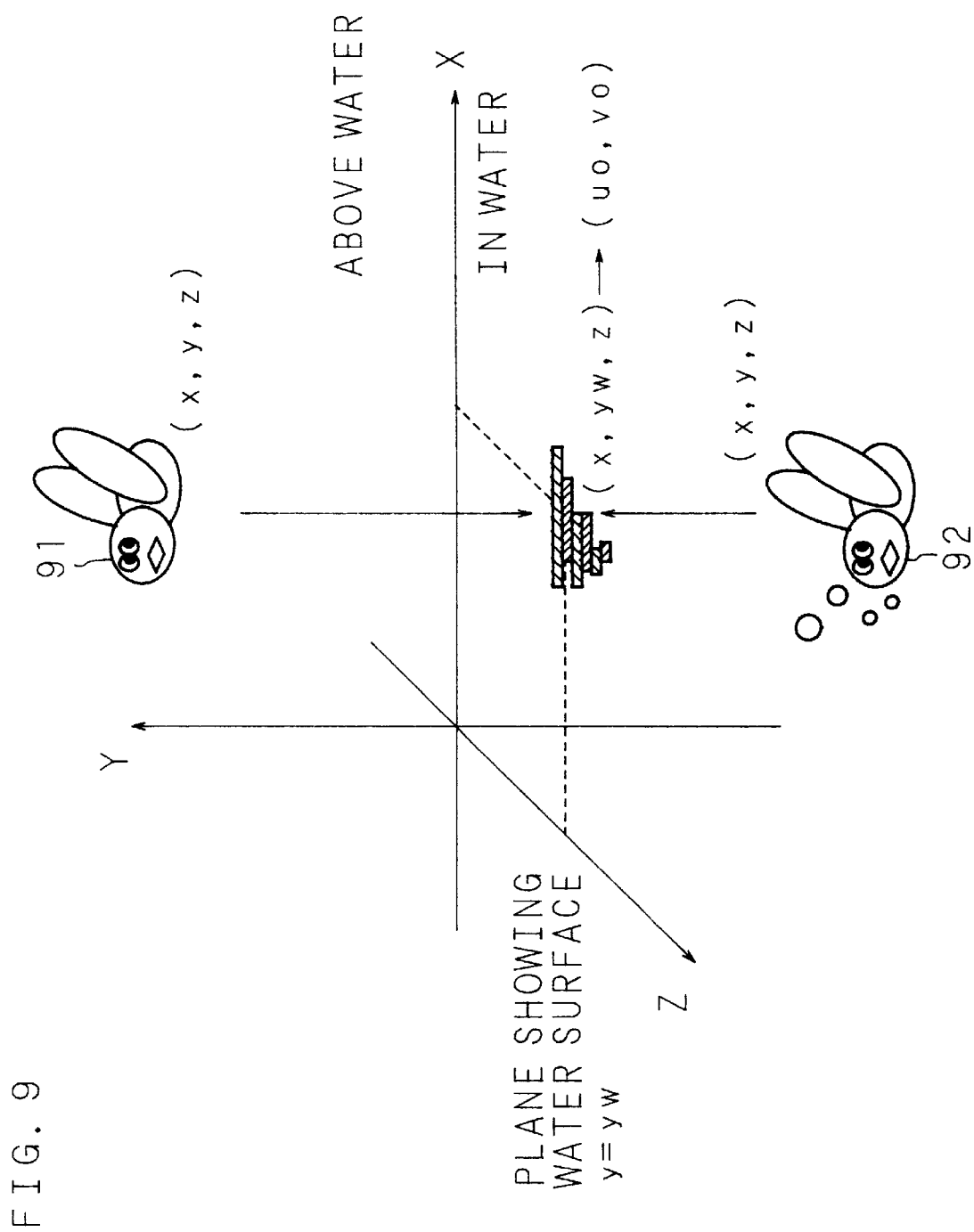
FIG. 9 is a diagram showing reflection of an object according to the fourth embodiment.

A fourth embodiment is structured to display a shadow created by an object flying over (or floating on) the water surface and a shadow of a diving object. FIG. 9 shows the coordinate system in a virtual three-dimensional space. As described above, the virtual three-dimensional space is converted so that a two-dimensional image to be displayed is created.

When height y=yw indicating the height of the water surface is employed as the reference, an object 91 having the height satisfying y>yw exists in the sky. On the other hand, an object 92 satisfying y<yw exists in water. The shadow of the object 91 existing in the sky is displayed on the water surface at a position immediately below the object 91, while the shadow of the object 92 existing in water is displayed on the water surface at a position immediate above the object 92. Therefore, the position on the water surface right above or below the object can be obtained by making the coordinates (x, y, z) of the object are made to be (x, yw, z).

Since light emitting from a light source, such as the sun, and brought into contact with the object is, in the real world, projected and displayed on the surface, a virtual light source may be provided to calculate the position at which the shadow of the object is projected on the water surface. However, the essential portion of the present invention is to relatively easily display an image with reality by using a personal computer or the like, that is, without a heavy process. Therefore, even if the shadow is always displayed just below or just above the object, movement of the object causes also the shadow to follow the movement of the object. Therefore, sufficiently visual reality can be realized. Therefore, this embodiment has an advantage because the load can be reduced.

Figure 10:
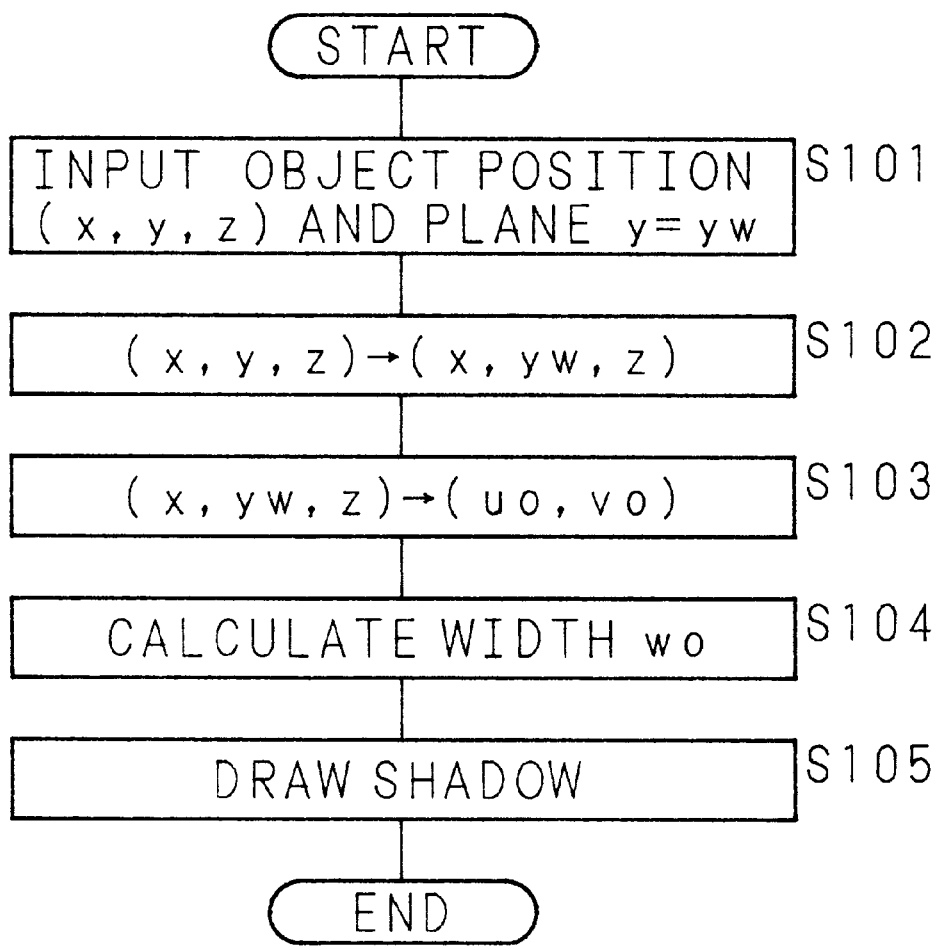
FIG. 10 is a flow chart showing the process according to the fourth embodiment.

The structure of the apparatus for performing the above-mentioned process is similar to that according to the third embodiment except for the structure in which the function for performing the process shown in FIG. 10 is added to the shadow drawing unit 63. The process shown in FIG. 10 will now be described. Initially, information of the position (x, y, z) of the object on the virtual three-dimensional space and the position y=yw of the plane indicating the water surface are input (S101). The coordinate y of the height of the object is made to be yw, the position of the object is reflected onto the water surface (S102). To display the shadow at the position on the water surface reflected to the virtual three-dimensional space, the three-dimensional coordinates (x, yw, z) are converted into two-dimensional coordinates (u0, v0) (S103).

The width w0 of the object in the direction u is calculated in accordance with the depth z of the object on the virtual three-dimensional space (S104). If the object is positioned on this side, w0 is enlarged. If the object is positioned deeply, w0 is reduced. Then, a program for drawing the shadow is activated. The drawing program is the same as that according to the third embodiment shown in FIG. 7. However, (u0, v0) in S71 is not the position of the object and the same is the position of the shadow obtained in S103.

Also in a case where the object moves in the sky or in water, the shape of the shadow is deformed in accordance with the movement vector similarly to the third embodiment. Thus, a state where the shadow follows the moving object can be displayed with satisfactory reality.

Fifth Embodiment: Creation of Ripples

Figure 11:
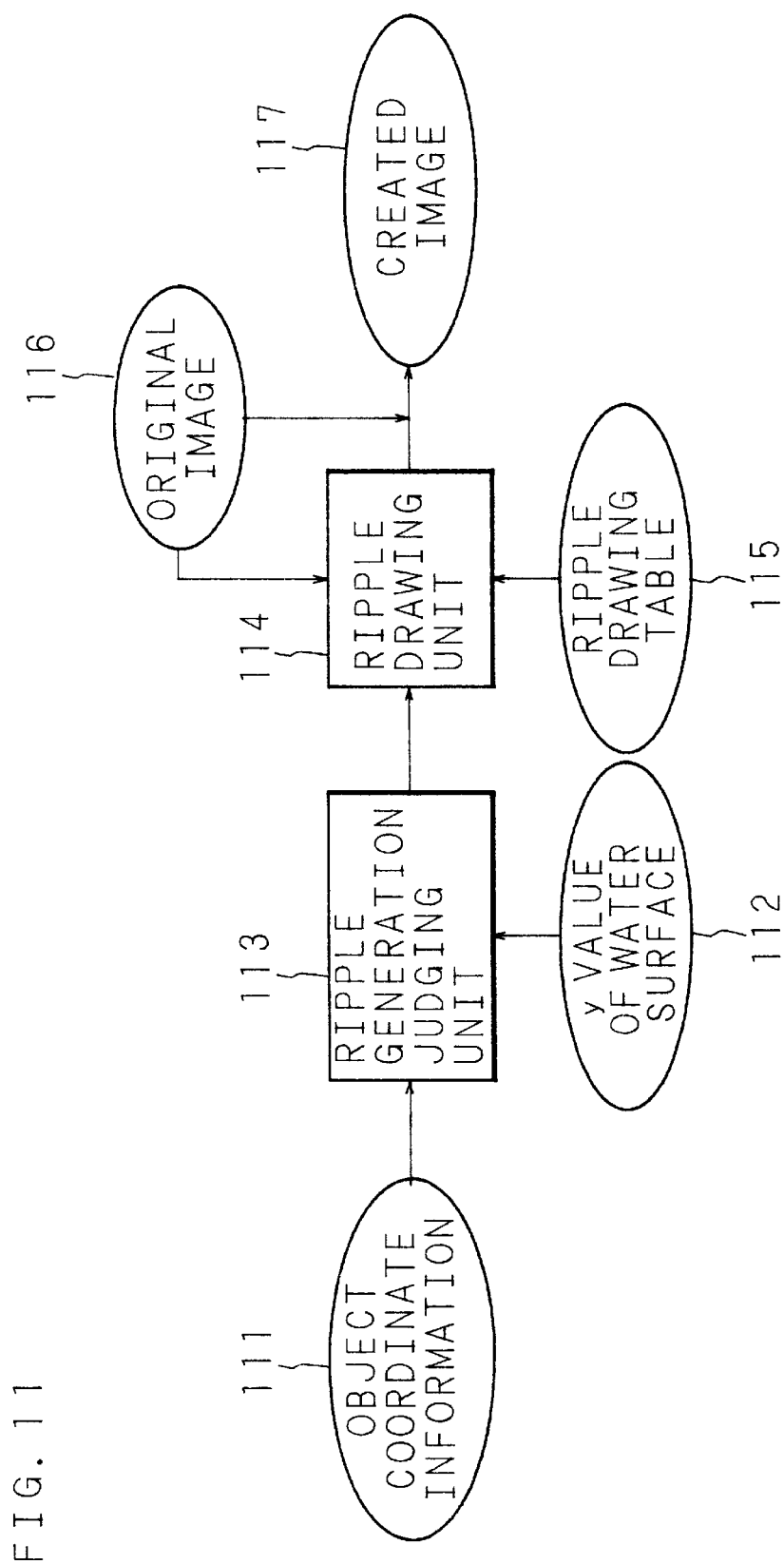
FIG. 11 is a block diagram showing the structure of a fifth embodiment.

FIG. 11 is a block diagram showing the structure of a device for creating ripples. In accordance with coordinate information 111 of an object in the virtual three-dimensional space and height yw of the water surface in the virtual three-dimensional space, a ripple generation judging unit 113 judges whether or not the object has passed through the water surface. Since the ripples are generated only when the object passes through the water surface, a ripple drawing unit 114 is activated when the passage has been judged. The process which is performed by the ripple generation judging unit 113 will now be described with reference to FIGS. 12 and 13.

Figure 12:
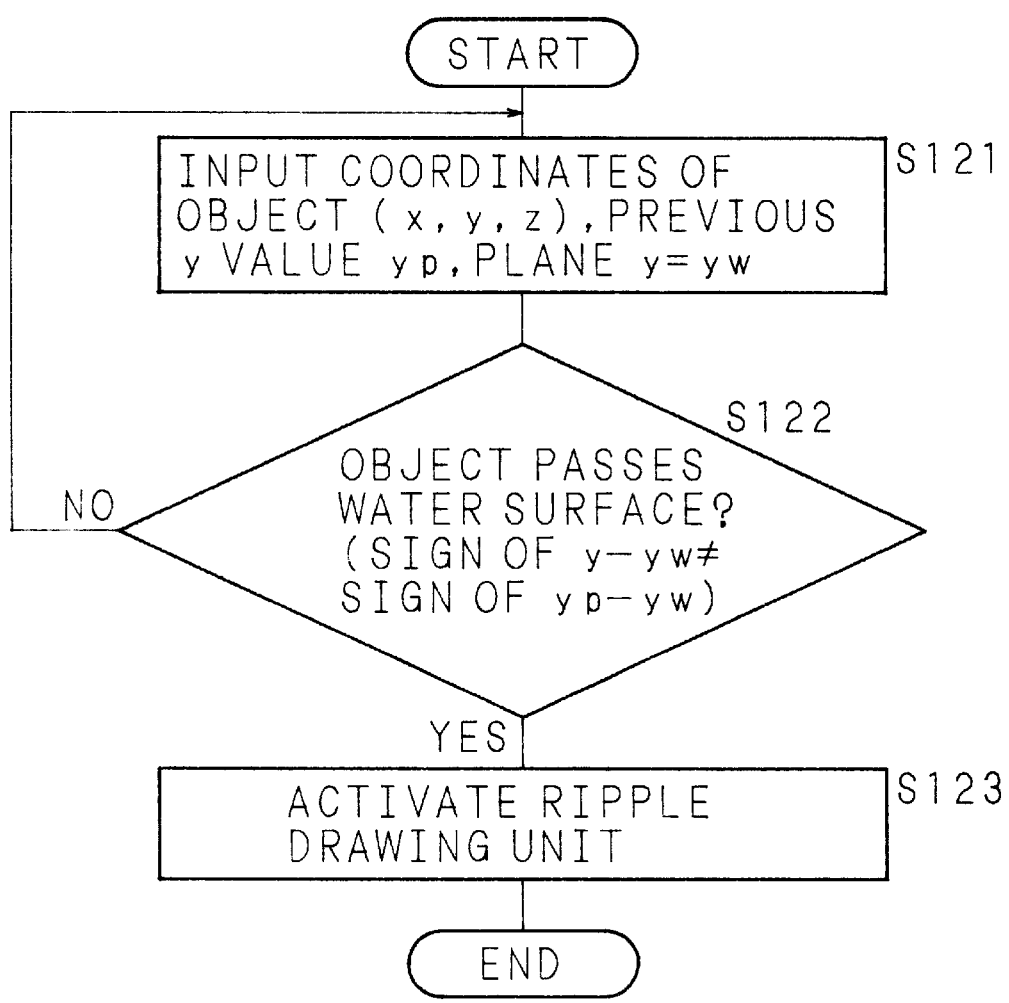
FIG. 12 is a flow chart showing a process for detecting a fact that an object passes through a water surface.

A flow chart shown in FIG. 12 will now be described. As described above, the coordinates (x, y, z) of the object in the virtual three-dimensional space and the height yw of the water surface are input. To judge whether or not the object has passed through the water surface, also height yp, which is one frame before the object, is stored (S121). To judge whether or not the object has passed through the water surface, the sign of y−yw and that of yp−yw are subjected to a comparison by using the height yw of the water surface as the reference. If they are different from each other, a judgment is performed that the object passes through the water surface (S122).

Figure 13:
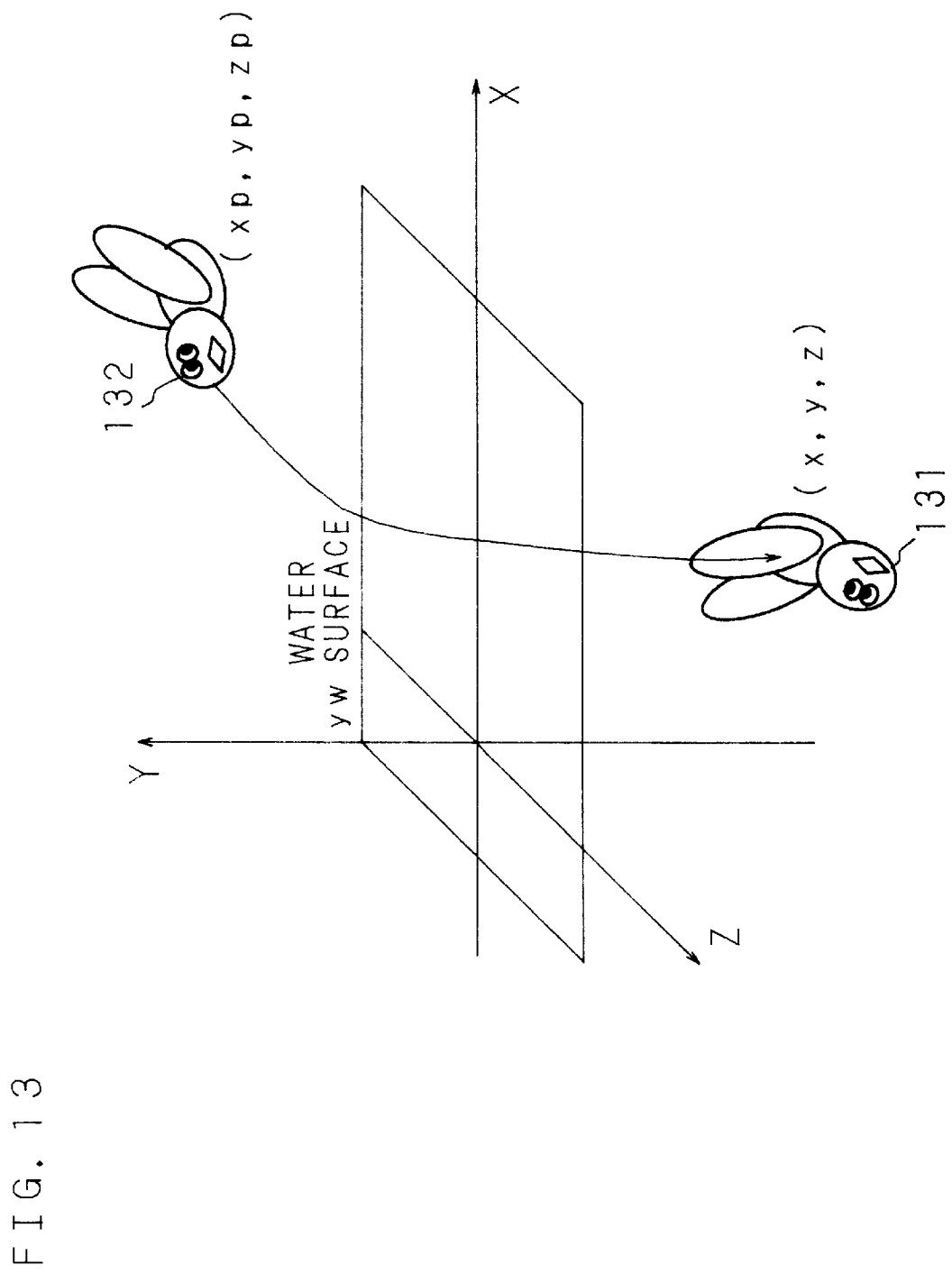
FIG. 13 is a diagram showing passage of the object through the water surface.

As shown in FIG. 13, the height yw of the water surface is subtracted from the height of a present object 131 and that of an object 132 (position (xp, yp, zp), xp and zp being ignored in this process) which is one frame before the present object 131. If the sign is +, the object is positioned higher than the water surface. If the sign is −, the object is lower than the water surface. Thus, a judgment can be performed if the sign is inverted in one frame. If no inversion of the sign is detected (NO in S122), the foregoing process is repeated whenever the image is updated for each frame. If the sign is inverted (YES in S122), the ripple drawing unit 114 is activated (S123).

Figure 14:
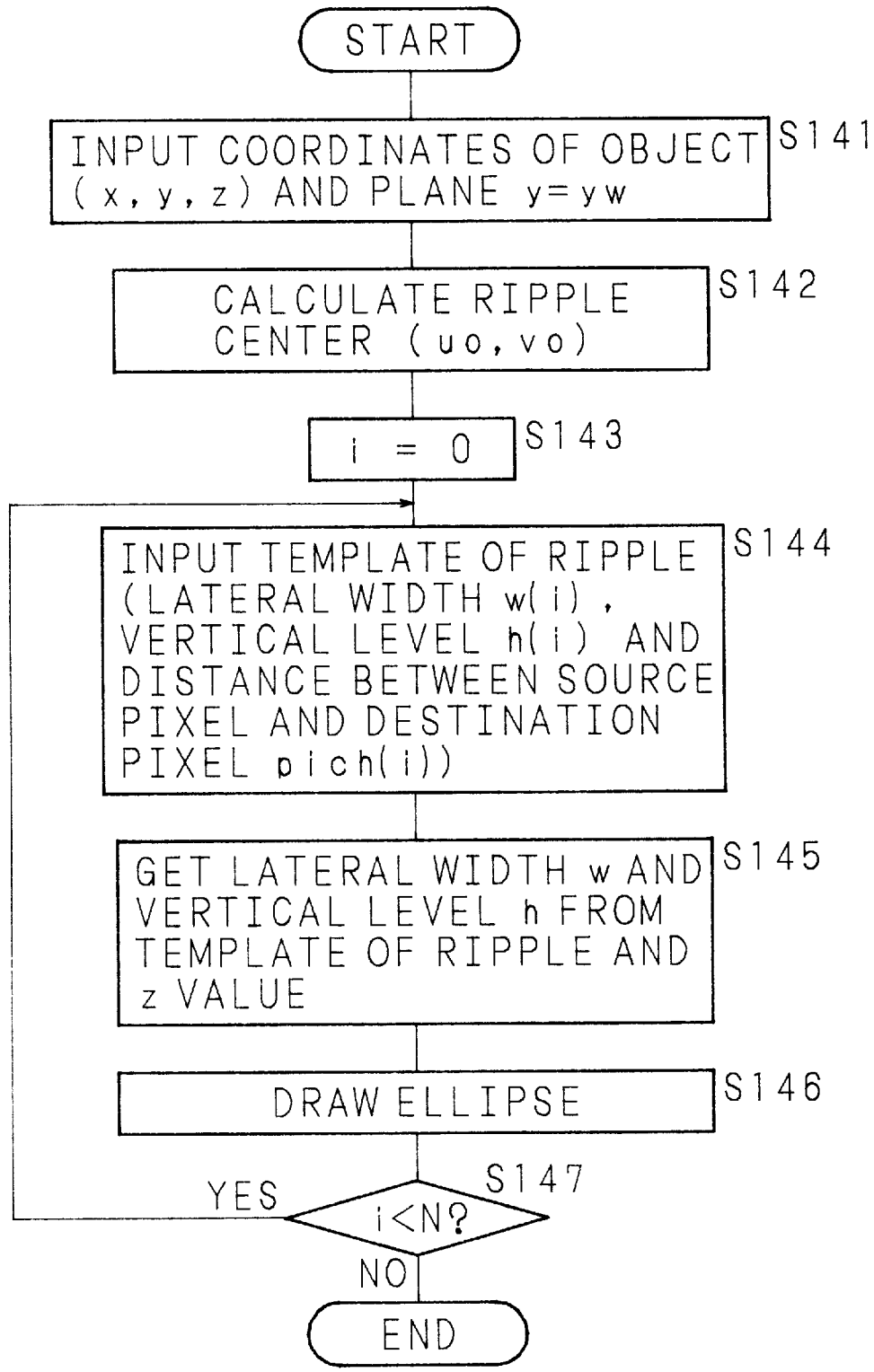
FIG. 14 is a flow chart showing a process for drawing ripples.

The process which is performed by the ripple drawing unit 114 will now be described with reference to FIGS. 14 to 16. Ripples, which are generated in a real space when an object has been dropped to a water surface, are in the form of a small ellipse having large size waves and the size of the ellipse is enlarged and the size of the wave is reduced as the time elapses when an image viewed from a diagonal position is considered. To express this, a ripple drawing table 115 showing the correspondence between the lapse of time and information for expressing the size and height of the ripples is prepared. The contents of the ripple drawing table 115 will be later.

The drawing process will now be described with reference to a flow chart shown in FIG. 14. Initially, the coordinates (x, y, z) of the object in the virtual three-dimensional space and height yw of the water surface are input (S141). Then, the position (u0, v0) of the ripple in the two-dimensional coordinate system of the display screen is calculated (S142). The foregoing calculation is performed such that the three-dimensional coordinates (x, yw, z) are converted into U-V coordinate system in accordance with x and z among the coordinates of the object in the virtual three-dimensional space and the height yw of the water surface. Strictly, the point (y=yw) at which a vector from the position (xp, yp, zp) of the object which is one frame before to the present position (x, y, z) reaches the water surface is the accurate center of the ripple. Although the above-mentioned process may be employed, it is preferable that the method according to this embodiment be employed because the load can be reduced.

Then, initial value zero is set to count value i indicating an elapse of time (S143). Then, the processes in S144 to S147 are repeated until the count value is increased to predetermined time N at which the ripple disappears. Initially, the lateral width w (i) of the ripple, the vertical level h(i) of the ripple and pich (i) for expressing the height are extracted from the ripple drawing table 115 (S144).

The ripple drawing table 115 is a table showing the relationship among the values w (i), h (i), pich (i) and time i shown in FIG. 15. The ripple drawing table 115 is not always required, and thus functions of w (i), h (i) and pich (i) may be used to calculate the values whenever required.

However, employment of the structure in which a reference to the table is made is advantageous in terms of the processing speed.

Figure 15A:
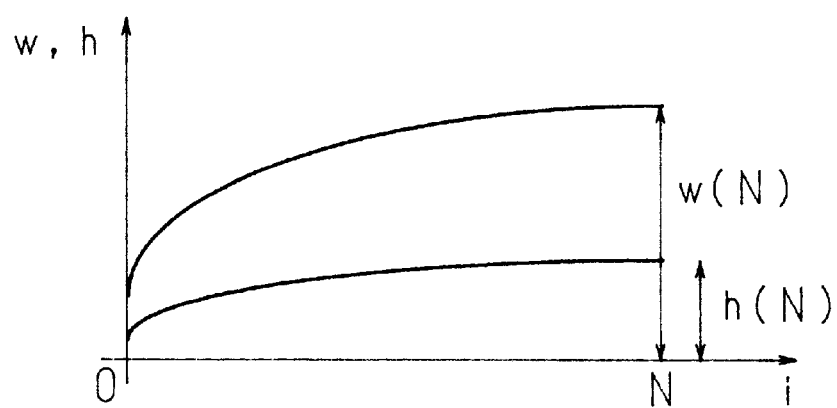
FIGS. 15A and 15B are diagrams showing the contents of a ripples drawing table.
Figure 15B:
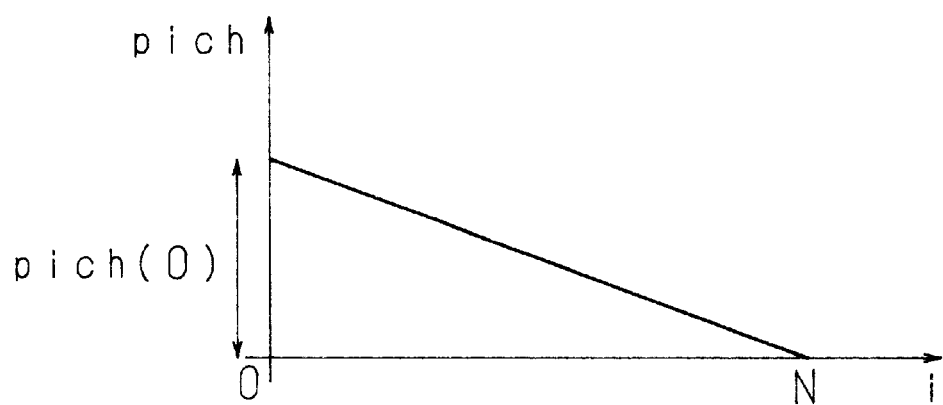

FIG. 15A is a graph showing examples of the functions of the correspondence among w (i), h (i) and time i. As described above, the size of the ripple is enlarged as time elapses. Since the above-mentioned correspondence is described in the ripple drawing table 115, the size of the ripple realized at each time can easily be obtained. FIG. 15B is a graph showing information as pich for expressing the height of the ripple. The meaning of pich will now be described with reference to FIG. 16.

Figure 16A:
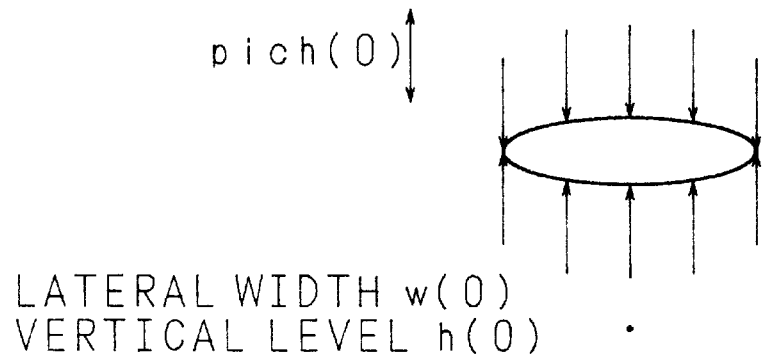
FIGS. 16A to 16C are diagrams showing a process for drawing a state where ripples are extended.

FIG. 16A shows a ripple which is generated first. As described above, the size of the ripple must be reduced and the height must be displayed to be large. To display the height, this embodiment has a structure in which colors of adjacent pixels are sequentially copied to draw an ellipse. As described above, the color tone of the water surface is delicately changed. The reason for this is that an arrangement must be realized in which a certain pixel and an adjacent pixel are slightly different from each other in color and pixels distant from each other are considerably different from each other in color.

Figure 16B:
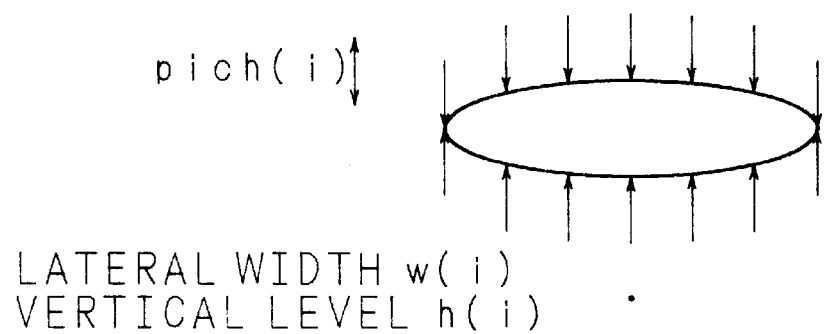
Figure 16C:
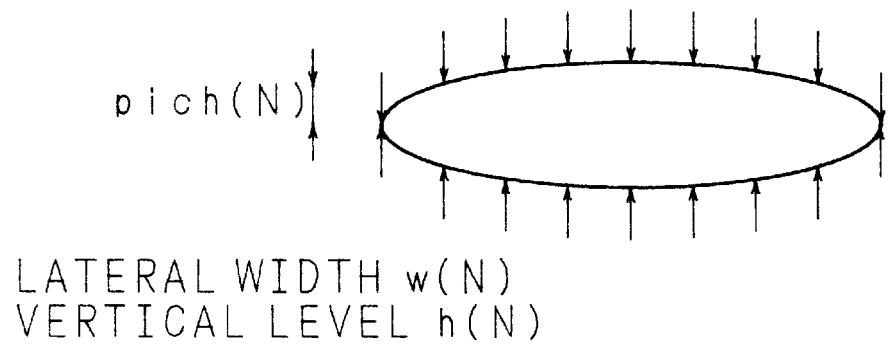

To express a high ripple in a pseudo manner by using the above-mentioned arrangement, display is performed in such a manner that the difference in the color is made to be considerable from the adjacent pixels and gradations are given as the ripples are lowered. That is pich indicated the distance to the pixel which must be copied. By shortening the distance as time i elapses, expression can be performed in such a manner that the ripples are gradually fused with the surrounding water surface and thus the ripples disappear. FIGS. 16B and 16C respectively show states where time elapses. The lateral width (i) and the vertical width h (i) of the size of the ripples are enlarged in accordance with the function shown in FIG. 15A. On the other hand, the distance pich to the pixel which must be copied is shortened so that the color of a nearer pixel is copied so that an expression in which the ripples gradually disappear can be performed. Therefore, the value of pich is made to be a function which is reduced as time elapses, as shown in FIG. 15B.

When the values w (i) and h (i) are extracted from the ripple drawing table 115, the lateral width w and vertical level h of an ellipse which must be drawn are determined in accordance with the value v0 or z of the center of the ripple which corresponds to the depth (S145). Then, an ellipse having the calculated lateral width w and the vertical level h is drawn (S146). As shown in FIG. 16, the pixels in the upper portion of the ellipse are drawn by copying the pixels positioned in the upper portion by pich (i) and the pixels in the lower portion of the ellipse are drawn by copying the pixels positioned in the lower portion by pich (i). Then, whether or not i has reached N, that is, whether or not predetermined times has elapsed is judged (S147). If i has reached N, the process is completed here. If i has not reached N, the processes in S144 to S146 are repeated so that a ripple as shown in FIG. 16 is created.

Figure 17:
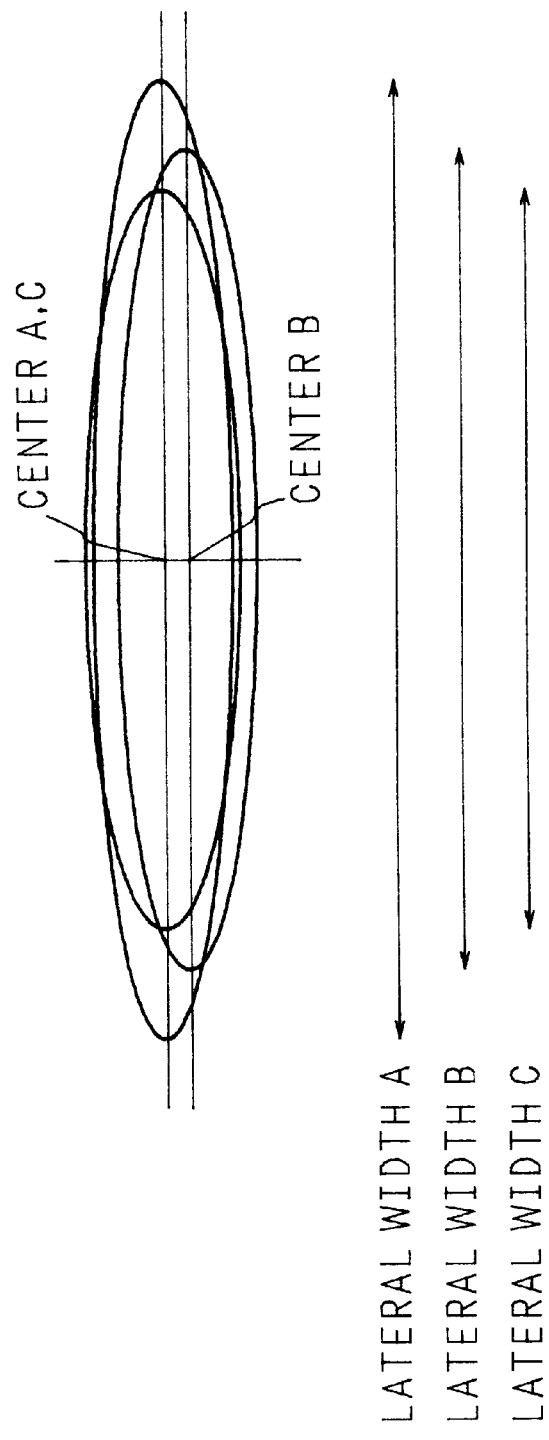
FIG. 17 is a diagram showing creation of ripples by superimposing a plurality of ellipses.

If sufficient processing performance is permitted, a plurality of ellipses having slightly different sizes as shown in FIG. 17 are drawn in such a manner that their centers are slightly shifted in the vertical direction. Thus, further stereoscopic ripples can be drawn.

Although this embodiment is structured such that ripples are generated only when an object has passed through the water surface, an eighth embodiment may be employed in which a ripple is created at the instructed center when a signal indicating display of a spray exists in a case of a spray of rain is displayed.

Sixth Embodiment: Display of Wave at a Short Distance

Figure 18:
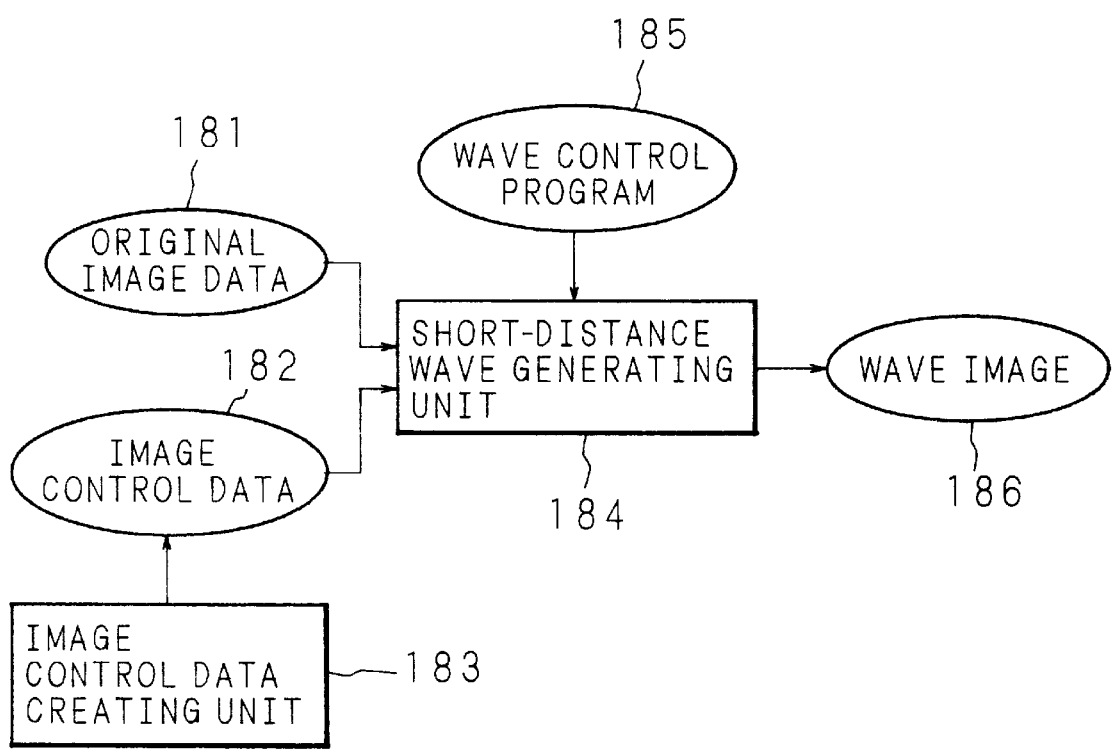
FIG. 18 is a block diagram showing the structure of a sixth embodiment.
Figure 19:
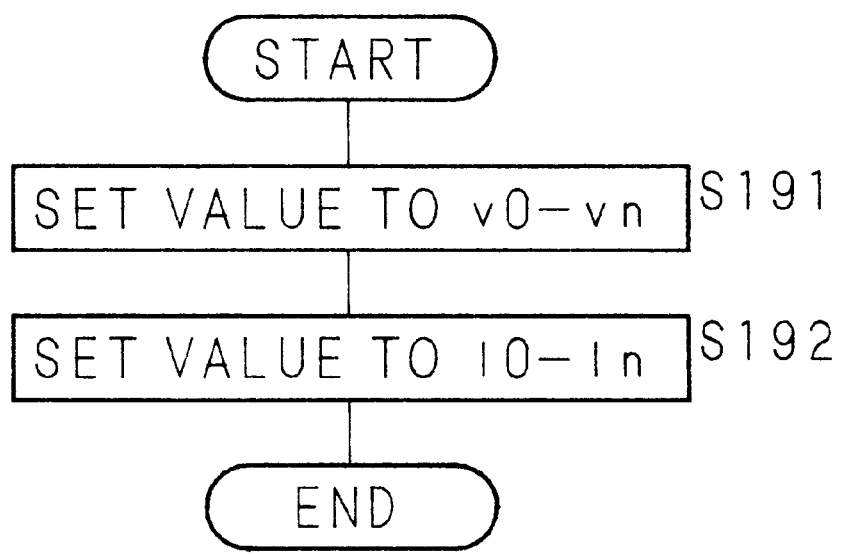
FIG. 19 is a flow chart showing setting of image control data according to the sixth embodiment.

The structure of a sixth embodiment will now be described with reference to FIG. 18. Reference numeral 181 represents original image data including the water surface, and 182 represents image control data which stores data generated by an image control data creating unit 183. The creating process will be described later with reference to FIG. 19. Reference numeral 184 represents a short-distance wave generating unit which uses a wave generating signal supplied from a wave control program 185 as a trigger to draw a wave in original image data 181 so as to output a wave image 186. The wave control program 185 generates a wave generating signal for generating a wave when, for example, wind blows.

In this embodiment, a state where waves surge (the water surface stands) from a distant portion to a near portion (from an upper position to a lower position in the U-V coordinate system) is expressed. The process which is performed by the image control data creating unit 183 for creating image control data 182 for use to express the foregoing state will now be described with reference to FIGS. 19 and 20. FIG. 21 is a diagram showing generation of waves in which waves are displayed from a deep position to the position on this side.

Initially, coordinate vi ($0 \leq i \leq n$) on the two-dimensional coordinates on which the waves must be displayed is determined (S191). The U-V coordinate system of the two-dimensional image which must be displayed can be obtained by converting the virtual three-dimensional coordinate system. The distance from coordinate vi and next coordinate (vi+1) is made to be always constant in the direction z (in the direction of the depth) in the virtual three-dimensional space. The distance is converted into U-V coordinate system so that the foregoing coordinate vi is determined. When the conversion into the U-V coordinate system has been performed, the intervals are expanded in the portion on this side when viewed from a virtual viewpoint, that is, in the lower side of a two-dimensional image, and the intervals are condensed in the deep portion when viewed from the virtual viewpoint, that is, in the upper side of the two-dimensional image.

Then, the left-hand end ui of the water surface in the coordinate vi is obtained, and then the distance li to the right-hand end of the water surface is obtained. The foregoing process may be performed by manually obtaining the coordinates or by searching the water surface with a program. The combination (vi, ui, li) is obtained in a region from i=0 to i=n so as to be stored as image control data 182 (S192).

Figure 20:
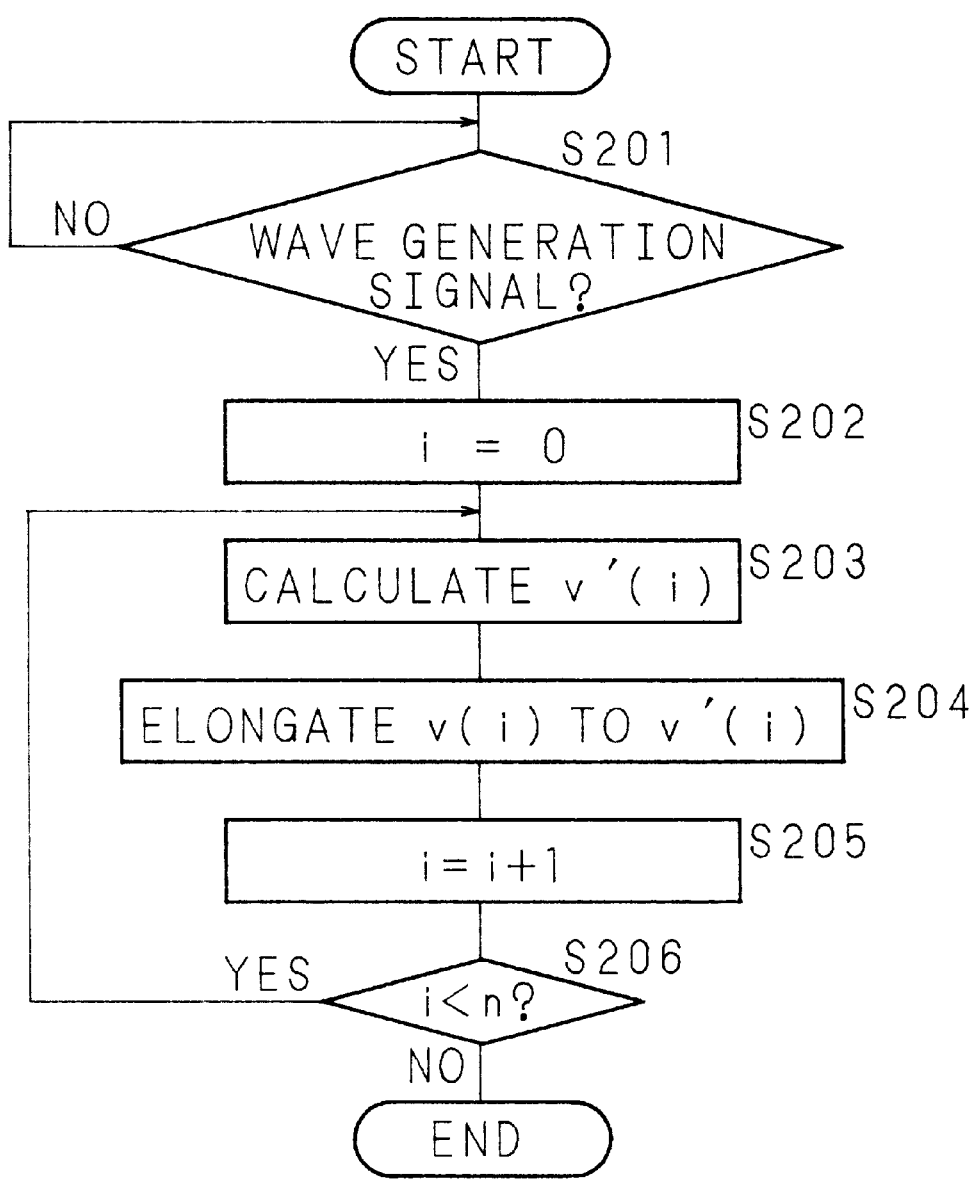
FIG. 20 is a flow chart showing a drawing process according to the sixth embodiment.

A process for drawing waves on the water surface of original image data 181 is performed by using thus-generated image control data 182 will now be described with reference to FIG. 20. When a wave generation signal has been obtained in a standby state (S201) for a wave generation signal from the wave control program 185, i is set to be zero (S202).

Figure 22:
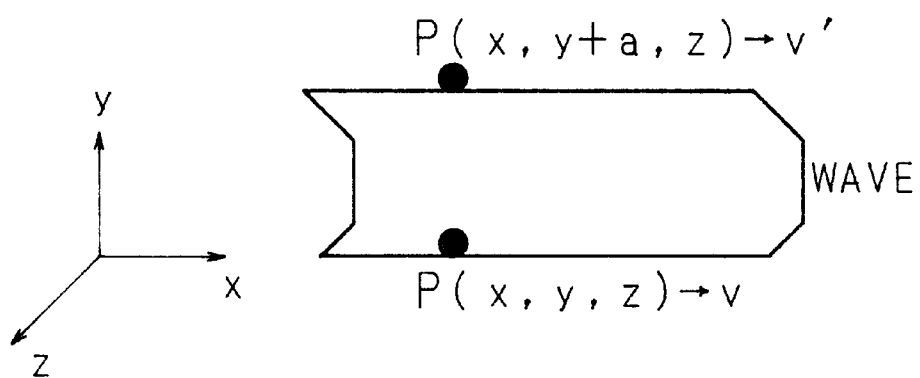
FIG. 22 is a diagram showing elongation of waves on a virtual three-dimensional space.

Then, a rectangular region having apexes which are (vi, ui), (vi+li, ui), (vi, ui+1), (vi+li, ui+1) is elongated so that a state where the water surface stands is expressed (S203 and S204). The elongating ratio a varies depending upon the intensity of the wave required to be expressed, the elongating ratio a being instructed from, for example, the wave control program 185. Note that the height of the wave is, as shown in FIG. 22, added by the same height a in the direction y in the virtual three-dimensional space. To express the height of the wave in the U-V space, drawing is performed in such a manner that data of, for example, a pixel (vj, uj) existing in the above-mentioned region is copied to the position (vj, (vj−uj+1)×k). If the position of (vj−uj+1)×k is not an integer, writing to an adjacent pixel may be permitted. As an alternative to this, interpolation may be performed.

The coefficient k is made to be a value with which the height is elongated by a in the virtual three-dimensional space as a result of the elongation. Since the intervals in the direction V of the rectangular region are the same, multiplication of the same coefficient results elongation by substantially the same height a in the virtual three-dimensional space. Then, i is increased (S205), and the process is repeated until i reaches n (S206) so that a state where waves are surged is expressed.

A contrary structure may be employed in which the initial value of i is made to be n and i is decreased from n to 0. In this case, back rush from this side to the deep position can be expressed.

Seventh Embodiment: Creation of Long-Distance Wave

Figure 23:
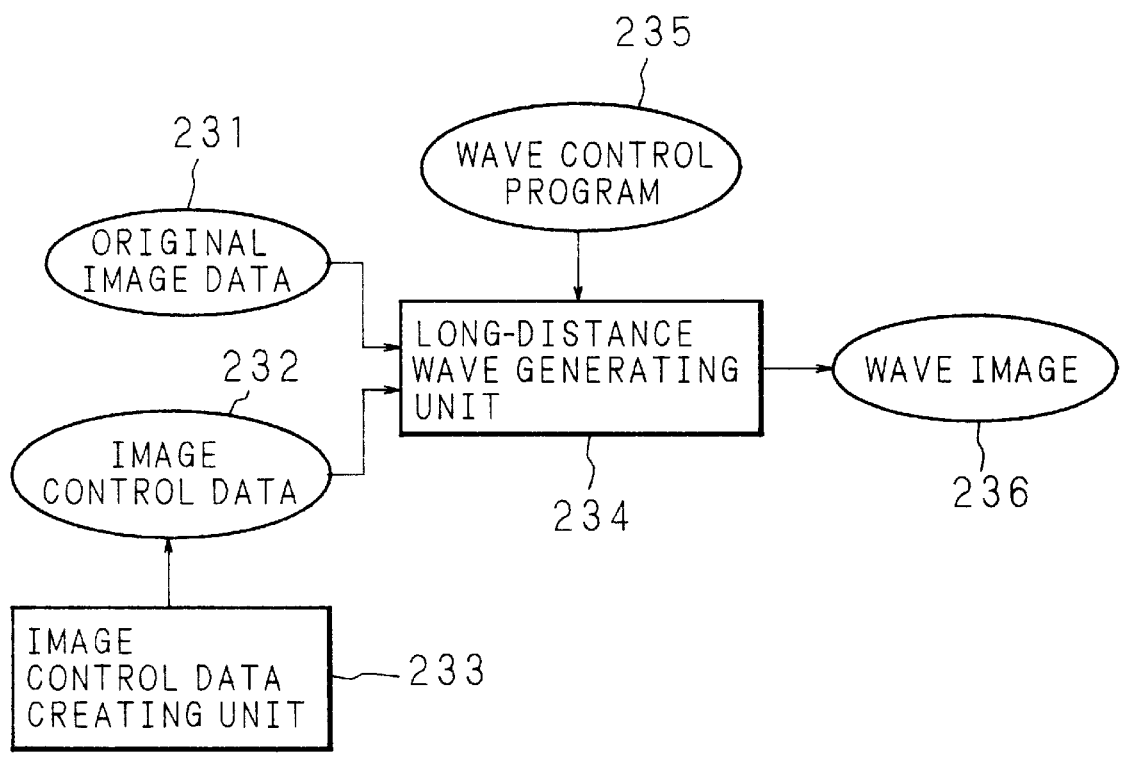
FIG. 23 is a block diagram showing the structure of a seventh embodiment.

FIG. 23 is a block diagram showing the structure of a device for drawing long-distance waves. Reference numeral 231 represents original image data including the water surface. Image control data 232 is created by an image control data creating unit 233. A long-distance wave generating unit 234 uses a wave generating signal supplied from a wave control program 235 as a trigger to draw a long-distance wave on the original image so that a wave image 236 is created.

Initially, the wave which must be drawn in this embodiment will now be described with reference to FIG. 24. FIG. 24A shows the water surface and a state of waves which must be drawn. In this case, n lines indicating the waves are created. The v coordinate in the U-V coordinate system in which the lines exist is made to be vi (i is an integer from 0 to n). The n waves are gradually moved to this side to express the state where the waves exist. Since the sixth embodiment expresses the state where the height of the waves is changed, waves on the water surface near the viewpoint can satisfactorily be expressed. Since the waves distant from the viewpoint are expressed in the seventh embodiment, a state can be expressed in which waves in a color brighter than the color of the surface of the sea exist and the waves surge slightly.

If the wave surfaces are completely brightened, display is sometimes performed such that light flickers. In order to realize further satisfactory reality, this embodiment is structured such that dark colors and bright colors are alternately drawn to express the color of the surface of the sea. For example, when waves, such as v0, v2, v4, . . . having even number i are displayed in bright colors, waves, such as v1, v3, v5, . . . , having odd number i are displayed in dark colors. At a next drawing timing, the position of each vi is slightly moved to this side (to the viewpoint, that is, to the lower portion in the U-V coordinate system) as described above. Then, waves having even number i are displayed in dark colors and waves having odd number i are displayed in bright colors. Thus, slight move of the waves and color inversion are repeated so that a state where waves exist on the distant water surface is expressed.

Figure 25:
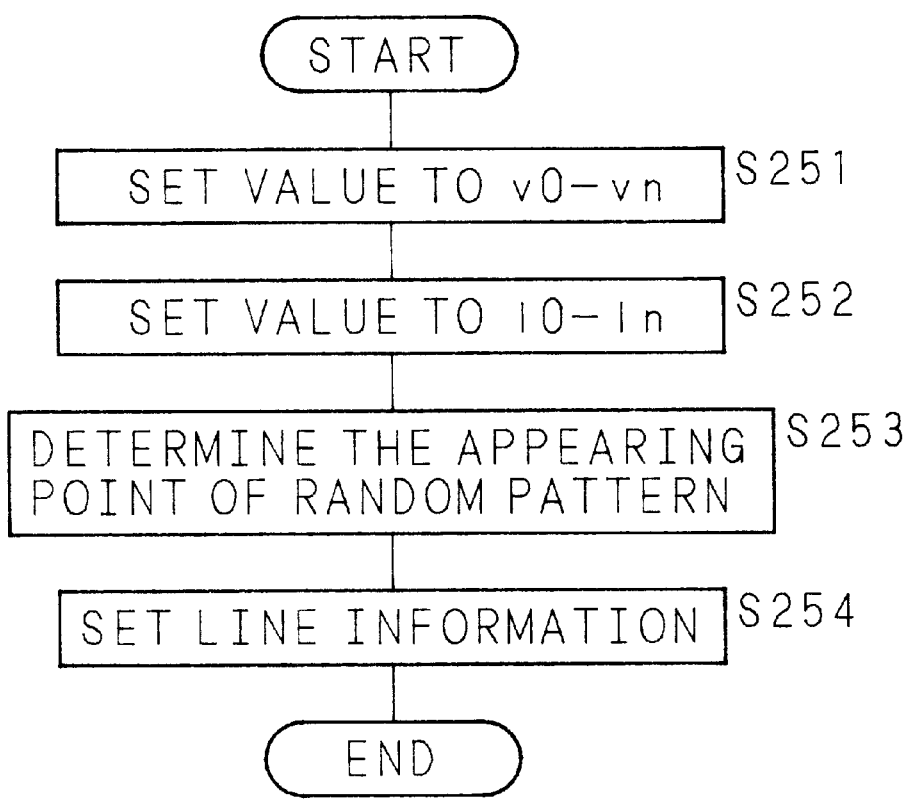
FIG. 25 is a flow chart showing setting of image control data according to the seventh embodiment.

A preparation process for the foregoing expression which is performed by the image control data creating unit 233 will now be described with reference to FIG. 25. Initially, initial position vi (i is an integer from 0 to n) in the direction V for displaying the waves is determined (S251). It is preferable that the intervals in the direction z in the virtual three-dimensional space be the same, similarly to the sixth embodiment. Then, width li of the water surface corresponding to the line at the coordinate vi is obtained (S252). The foregoing process may be performed manually or searched with a program.

Then, a random pattern for determining a pixel with which the color of the wave is determined for each line (S253). To perform this, one line 240 indicated with a binary value is created with a random number. Then, the line is cut from vi by each li so as to set a binary value to the pixel included in the line for each line. Obtained information of the line is set as image control data 232 (S254). The binary value is used to distinguish pixels for drawing the colors of the waves and pixels which are not used to draw the waves (the color of the original water surface is retained) from each other.

Figure 26:
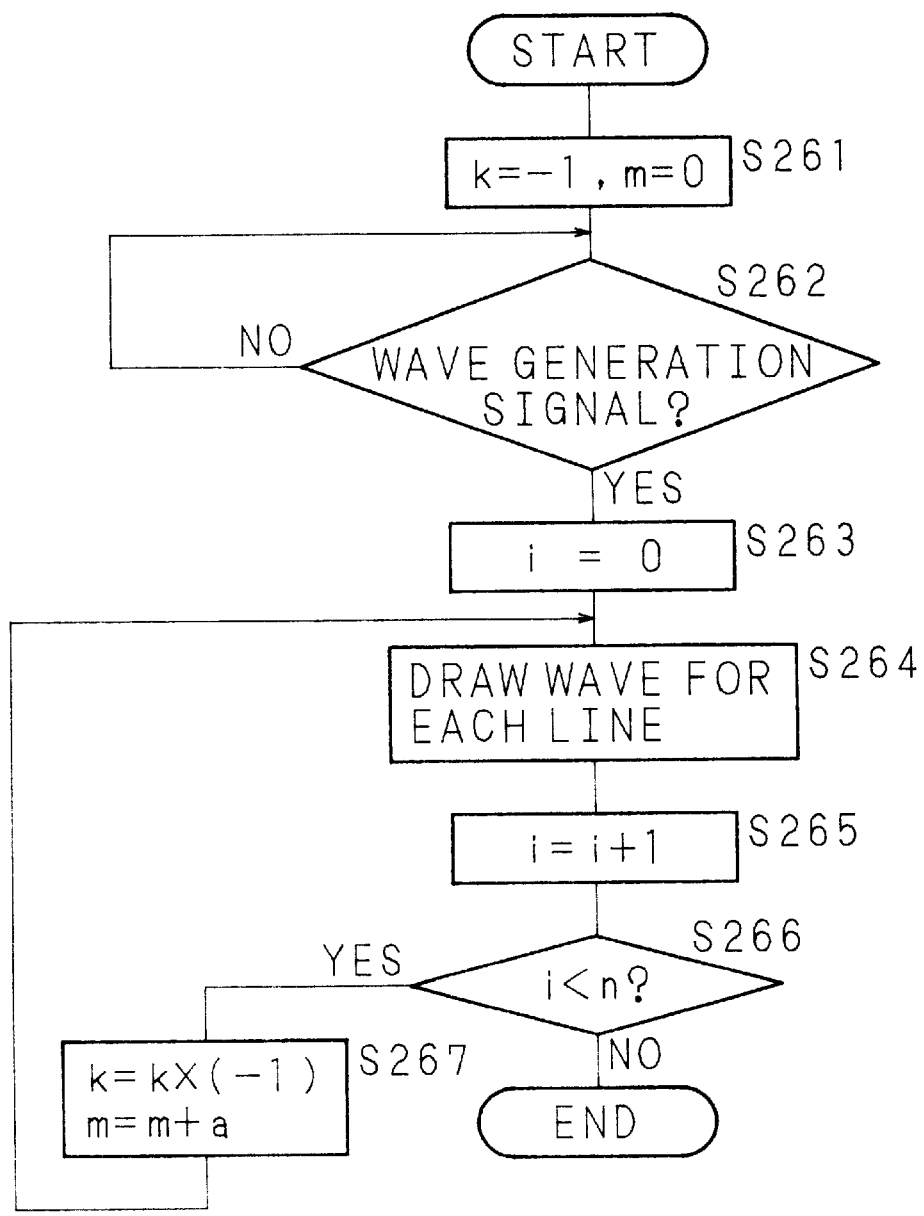
FIG. 26 is a flow chart showing a drawing process according to the seventh embodiment.

Then, a process for drawing the waves will now be described with reference to a flow chart shown in FIG. 26. Initially, initial values k=−1 and m=0 are set (S261). The initial value k is used to judge whether the wave of each line is displayed in a bright color or a dark color. The initial value m indicates the amount of movement of the wave. When a wave generating signal is received in a state for waiting a signal from the wave control program 235 (S262), i=0 is set to generate the uppermost wave (S263). Then, the position (coordinate V) at which the line of the wave is drawn is set to be (vi+m). If i is an even number in a case where k is −1, the wave is displayed in a bright color at the position. If i is an odd number, the wave is displayed in a dark color. If k is 1, the wave is displayed in a dark color in a case where i is an even number. If i is an odd number, the wave is displayed in a bright color. The position (the U coordinate) at which the color of the wave is written is determined in accordance with image control data 232 (S264). Thus, waves for one line are drawn.

Then, i is increased (S265). If i does not reach n (YES in S266), the value of k is multiplied with −1 to change the color of the waves in each line to invert the sign of k. Moreover, a predetermined value a is added to m in order to move the wave (S267). Then, processes in S264 and S265 are repeated. After waves for all lines have been drawn (NO in S266), the process is ended.

As described above, the seventh embodiment is able to satisfactorily express the state where distant waves are generated. On the other hand, the sixth embodiment is able to satisfactorily express the state where waves surges. Therefore, it is preferable that a v coordinate serving as a boundary is determined to employ the seventh embodiment to draw the waves farther the boundary and waves nearer than the boundary are drawn by the sixth embodiment.

Eighth Embodiment: Spray of Rain

Figure 27:
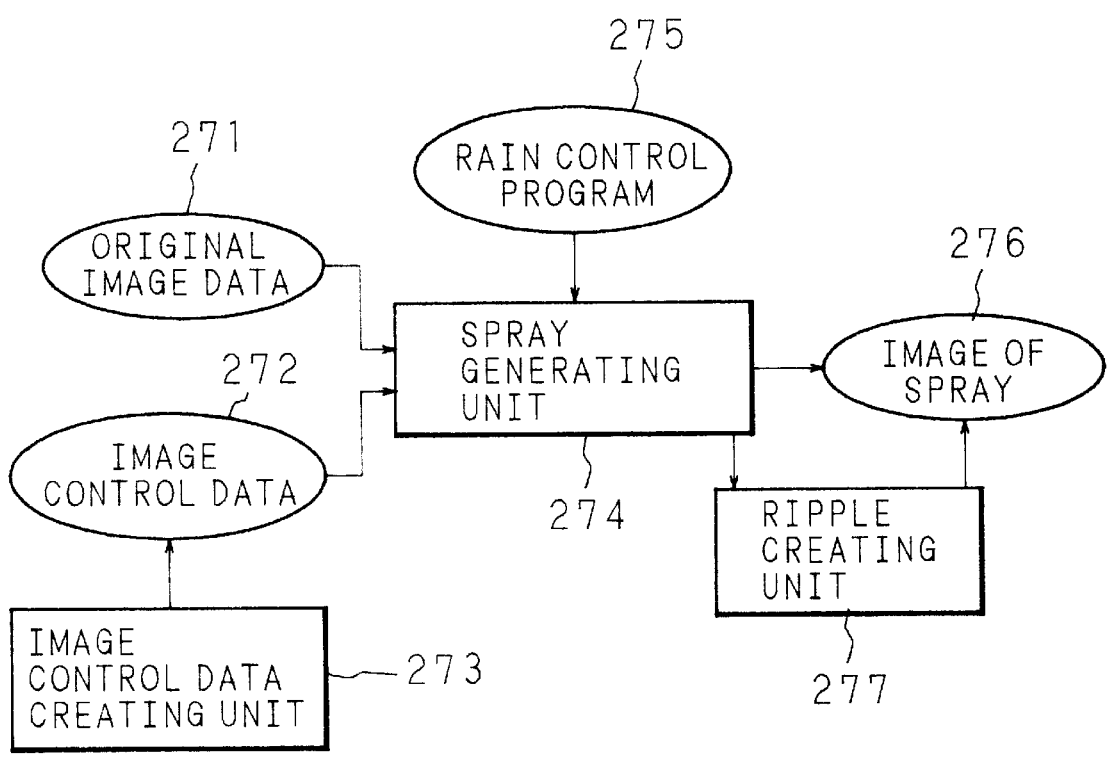
FIG. 27 is a block diagram showing the structure of an eighth embodiment.

FIG. 27 is a block diagram showing a device for drawing a spray occurring when a rain drops on the water surface. Reference numeral 271 represents original image data including the water surface. Image control data 272 is created by an image control data creating unit 273. A spray generating unit 274 uses a rain generating signal supplied from a rain control program 275 as a trigger to draw a spray of a rain on the original image so as to generate a wave image 276 of the spray of the rain. The rain control program 275 notifies the intensity of the rain. The spray generating unit 274 notifies a ripple creating unit 277 the position at which ripples must be generated and sizes of the ripples in order to display the ripples as described later.

Figure 28:
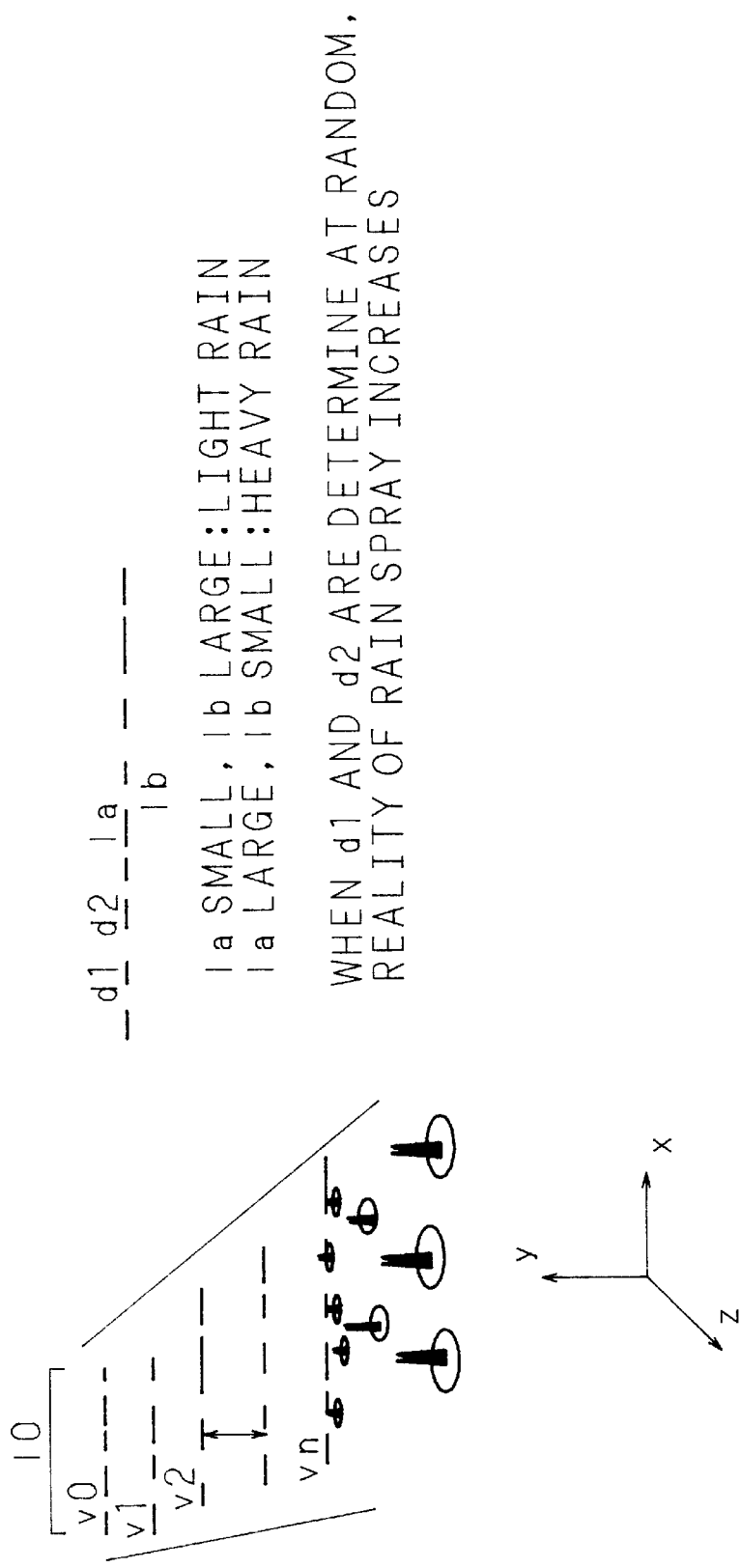
FIG. 28 is a diagram showing sprays of rain which are drawn in the eighth embodiment.

Sprays of a rain which must be drawn in this embodiment will now be described with reference to FIG. 28. Also the sprays of a rain are displayed in a different manner in accordance with the distance from the viewpoint. In a portion on this point when viewed from the viewpoint (in the lower portion in the U-V coordinate system), sprays are drawn and ripples are formed around the position at which the spray is generated (although the position at which the spray is generated and the center of the ellipse do not coincide with each other in FIG. 28 for convenience to draw FIG. 28, they must coincide with each other in actual). It is preferable that the creating device according to the fifth embodiment be employed to form the ripples.

Although the rain falls on the distant water surface is not required to be drawn because sprays and ripples cannot be recognized, a pattern is provided for the water surface in order to realize a state of the rain. The pattern is generated in such a manner that a prepared display color thicker than the color of the water surface and color of the pixel which is employed when the pattern is not drawn are blended. When the blending process is performed, the ratio (weighting) of the original pixel color and the display color obtained by blending is appropriately changed so that a further natural expression is performed.

Figure 29:
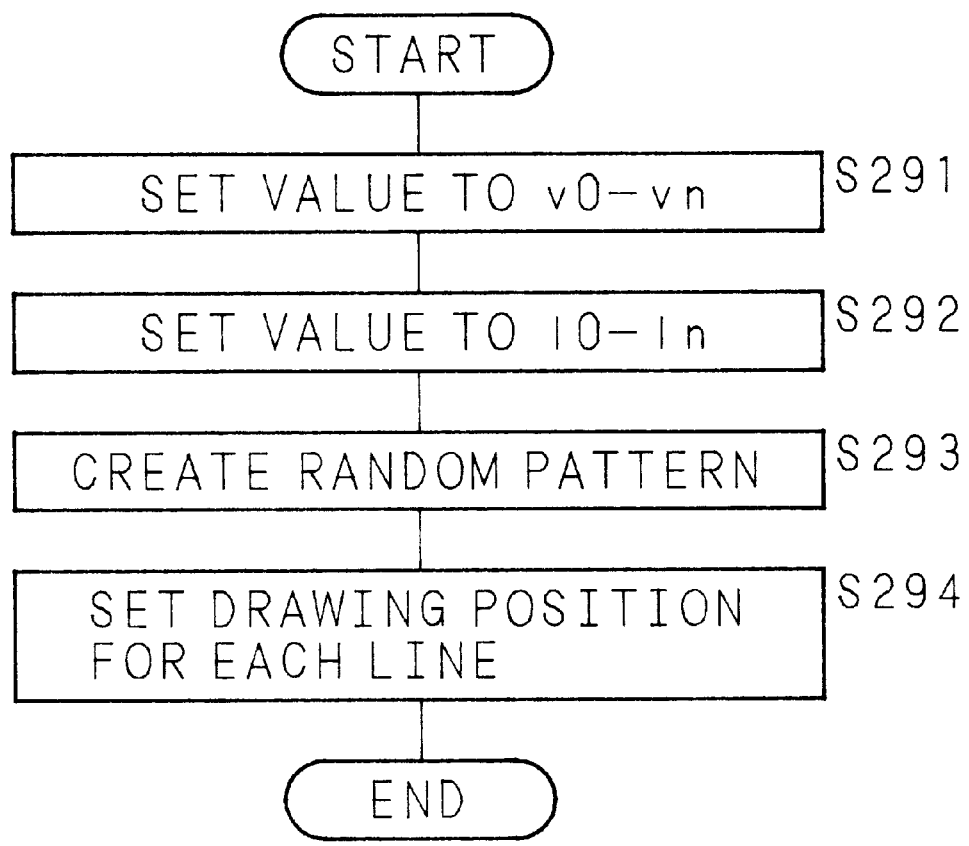
FIG. 29 is a flow chart showing setting of image control data according to the eighth embodiment.

A process for creating image control data 272 for use to display sprays of a rain will now be described with reference to FIG. 29. Initially, reference position vi (i is an integer from 0 to n) in the direction of V coordinate of the line for displaying a distant rain (S291). It is preferable that the intervals of lines be the same in the depth (the direction z) in the virtual three-dimensional space. Then, display width li of each line is determined in accordance with the width of the water surface (S292). The process may be performed manually or obtained by researching with a program.

Then, the positions of pixels for drawing the blended colors on each line are determined by generating a random pattern (S293). The random pattern is used to set the portion in which the display color is changed. Although the values may be binary values, it is preferable that different values be employed for display colors d1, d2, . . . , to change the display colors because further real expression can be performed. By cutting the generated random pattern for each length li of each line, the drawing position for each line is set to image control data 272 (S294).

Figure 30:
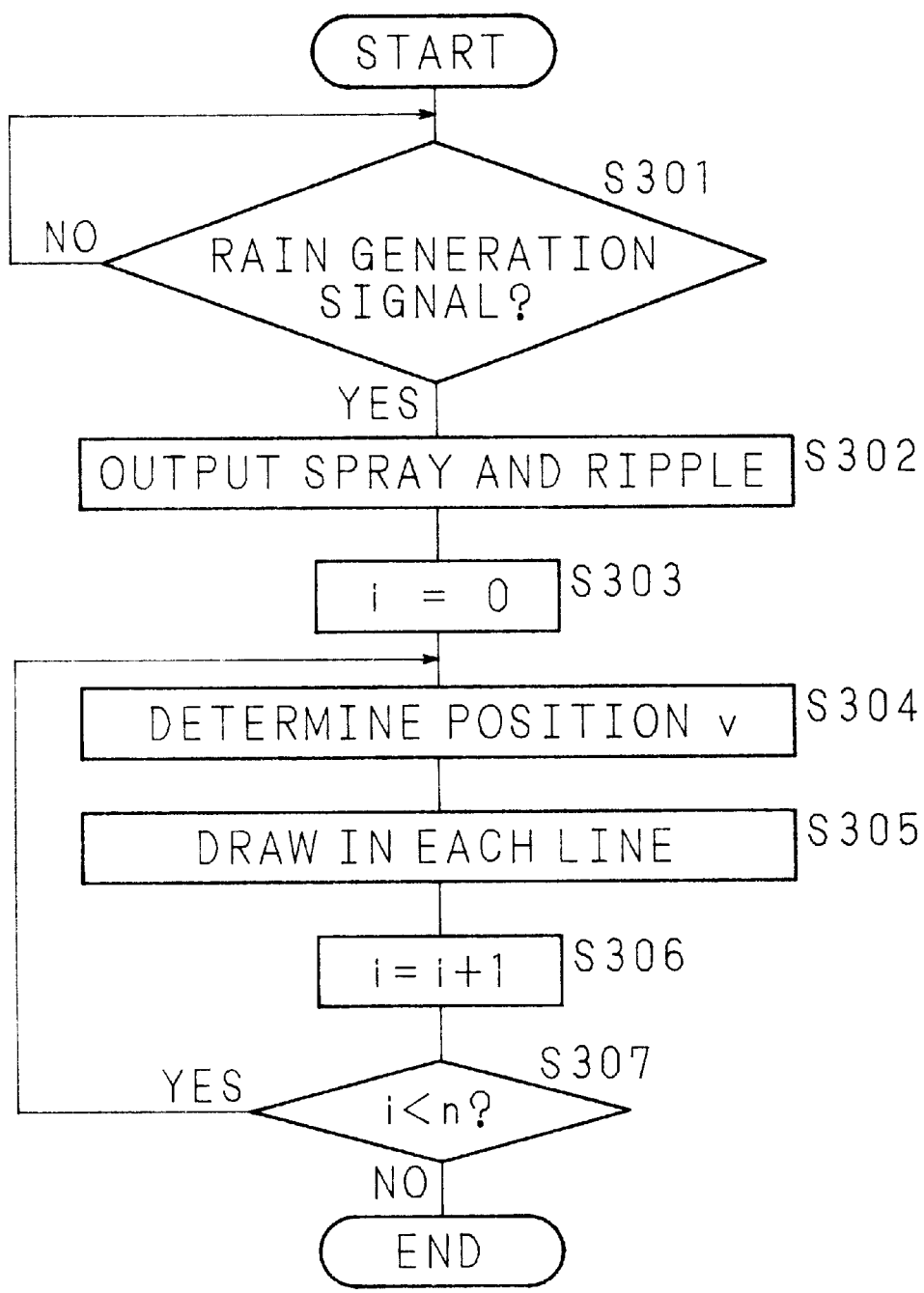
FIG. 30 is a flow chart showing a drawing process according to the eighth embodiment.

The operation of the spray generating unit 274 will now be described with reference to FIG. 30. When a rain generating signal is received in a state for waiting an instruction from the rain control program 275 (S301), sprays on this side and ripples are output (S302).

Since it is unnatural that the positions at which the rain sprays are generated are not changed, sprays are randomly generated in a range of the water surface at short distances from the viewpoint. It is preferable that the number of sprays which must be generated be changed in accordance with the intensity of the rain set by the rain control program 275. Although different processes are, in this embodiment, performed in accordance with the distance of the water surface, a boundary may previously be determined and the process may be changed in accordance with the intensity of the rain.

The sizes of sprays and ripples are changed in accordance with the intensity of the rain and the coordinates (value of z or that of v) of the position of the generated rain. The sizes are displayed large in inverse proportion to the distance from the viewpoint (in the lower portion of the image) and in proportion to the instructed intensity of the rain. The image of the sprays is previously created and it is reduced in accordance with the above-mentioned reference to change the display size.

To draw the distant water surface, zero is set to i (S303). Then, v coordinate of the line to be drawn is determined (S304). The v coordinate is randomly determined between vi coordinate and (vi+1) coordinate. Whenever drawing is performed, it is randomly changed so that natural expression is performed. Then, drawing on the determined line on the water surface having the v coordinate is performed (S305). The drawing process is, as described above, performed such that the color of the original pixel in original image data and a predetermined dark display color are blended in accordance with the weighting value for blending previously set to image control data to determine the display color to rewrite the pixels of the original image. To draw a next line, i is increased (S306). Then processes in S304 to S306 are repeated until i reaches n (NO in S307), that is, until drawing of all lines is ended.

As a result of the above-mentioned process, sprays and ripples are displayed near the viewpoint. Moreover, a state where the rain falls on the distant water surface can be displayed.

Ninth Embodiment: Reflection of Object to Water Surface

Figure 31:
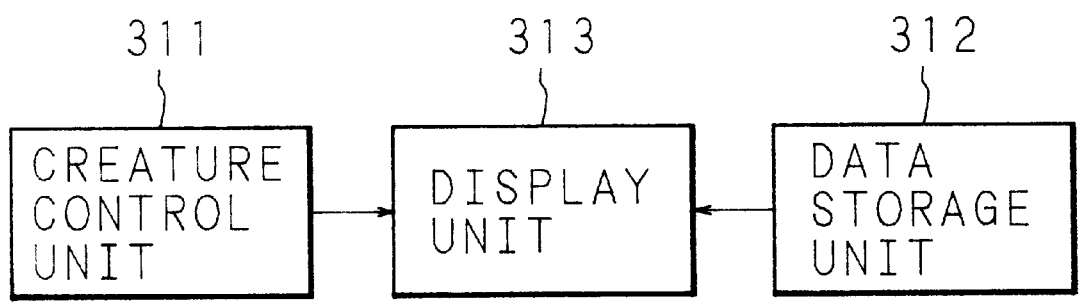
FIG. 31 is a block diagram showing the structure of a ninth embodiment.

A case will now be described in which an image of an artificial creature(character) positioned above the water surface and reflected on the water surface is created and displayed. FIG. 31 is a block diagram showing the structure of a ninth embodiment. An image creating apparatus according to the ninth embodiment comprises a creature control unit 311 for outputting a character display command, a data storage unit 312, such as a CD, in which two-dimensional image data obtained by converting three-dimensional image data obtained by actually photographing the character and information of three-dimensional coordinates are stored and a display unit 313 for creating and displaying the image of the character and an image of the character reflected on the water surface in accordance with the display command supplied from the creature control unit 311.

Figure 32:
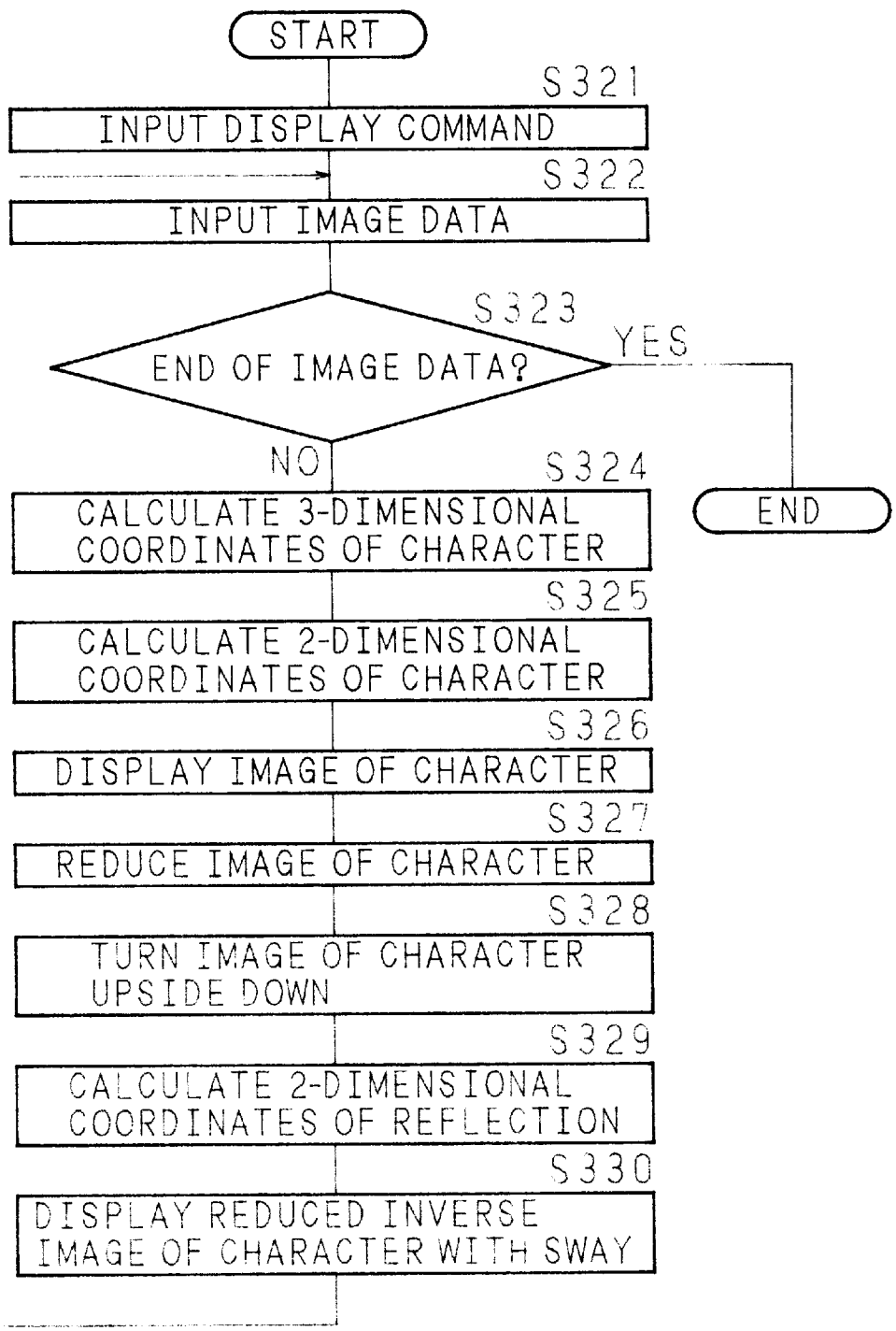
FIG. 32 is a flow chart showing a process according to the ninth embodiment.

The operation of the ninth embodiment will now be described with reference to a flow chart of the process in the display unit 313 shown in FIG. 32 and an example of an image of the character shown in FIG. 33.

Figure 33A:
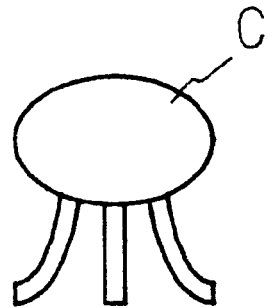
FIGS. 33A to 33C are diagrams showing the process according to the ninth embodiment to which a character image is subjected.

Initially, the display unit 313 receives, from the creature control unit 311, a command to display character C as shown in FIG. 33A (S321). The display command includes name of character C to be displayed and three-dimensional components x0, y0 and z0 indicating the difference from the display position and the original coordinates (x, y, z) of image data of the character C stored in the data storage unit 312. In accordance with the display command, the display unit 312 reads image data of the character C stored in the data storage unit 412 together with the original coordinates (x, y, z) of the character C to input the same (S322). Then, whether or not image data for all of the frames has been read is judged (S323). If reading has not been completed, the operation proceeds to S324. If reading has been completed, the display process is ended.

Then, original coordinates (x, y, z) of image data and the difference x0, y0 and z0 are added so that the three-dimensional coordinates (x+x0, y+y0, z+z0) of the position at which the character C is displayed are calculated (S324). The obtained three-dimensional coordinates are converted into U-V coordinates to calculate the two-dimensional coordinates (u, v) of the display position of the character C (S325). Then, an image of the character C as shown in FIG. 33A is displayed at the obtained coordinate position (S326). The above-mentioned technique for effectively using the storage capacity of the data storage unit 312 by shifting (parallel translation or enlargement/reduction) the pattern of image data of a certain reference by data indicating the difference to generate new image data has been disclosed in U.S. Ser. No. 08/369,110.

Figure 33B:
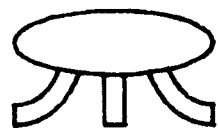
Figure 33C:
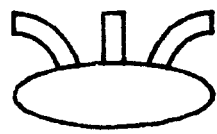

Then, image data of the character C is reduced to ½ in the direction V so that a reduced image of the character C as shown in FIG. 33B is obtained (S327). At this time, a process of thinning the pixels (a process for reducing 10 pixels in the direction V to five pixels) is performed so that the reduced image is obtained. Since the quantity of data can be reduced as described above, the load for the CPU can be reduced. Then, the reduced image of the character C is inverted in the direction V (in the vertical direction) so that a reduced and inverted image of the character C is obtained (S328).

Then, the three-dimensional coordinates (x+x0, 0, z+z0) indicating the position (the reflection position) at which the character C is projected to the water surface are converted into U-V coordinates to calculate the two-dimensional coordinates (ur, vr) of the position at which the character C is reflected to the water surface (S329). The reduced and inverted image of the character C is, in the color obtained by mixing the color of displayed water and the color of the displayed character C, displayed at the calculated two-dimensional coordinate position. Moreover, sway of the water surface is added (S330).

Then, the operation returns to S322 so that the processes in S322 to S329 are repeated until image data for all frames is read from the data storage unit 312.

As described in the first embodiment, the image region in which the sway of the water surface is performed is cut from the original image; and the cut image region is divided into elongated slice regions having the width of one pixel, and then an image obtained by adding random and lateral direction sway is displayed for each slice region so that the sway of the water surface is expressed. Therefore, the foregoing process in S330 is performed for each line having the width of one pixel.

Figure 34:
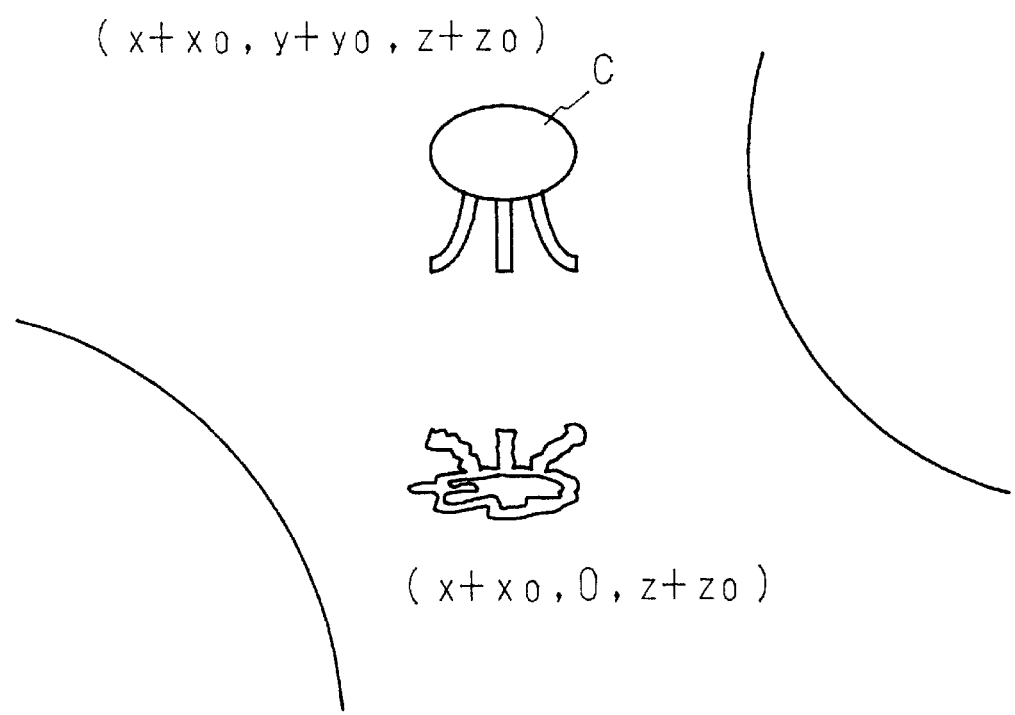
FIG. 34 is a diagram showing an example of display of a character image and an image reflected on the water surface.

FIG. 34 is a diagram showing the thus-created image of the character C and an example of a displayed image of the character C reflected on the water surface. The image of the character C reduced to half is inverted and displayed, and sway is added. Therefore, the reality of the state of the character C reflected to the water surface can be improved.

A further improved reality can be realized when the reflection of the character C to the water surface is attenuated in inverse proportion to the height of the character C from the water surface. Therefore, when the color of water and the color of the character C are mixed to determine the display color, this embodiment is structured such that the mixture ratio of the character C is raised if the character C is near the water surface. If the character C is distant from the water surface, the mixture ratio of water is raised. Assuming that the height of the character C from the water surface is h (a relative value employed when the height in a case where the character C is not reflected to the water surface is assumed to be 1), data representing the hue of the mixed color is calculated by the following equation:

Data of Hue of Mixed Color=(Data of Hue of Water)×$h$+(Data of Hue of Character $C$)×(1−$h$)

Since the mixture ratio of the color of water and that of the character C is changed in accordance with the height of the character C from the water surface, the image of the character C reflected to the water surface is displayed clearly and densely if the character C is near the water surface. If the character C is distant from the water surface, the image reflected to the water surface is displayed dimly. Thus, the reality can be improved.

Tenth Embodiment: Light Radiation from Spot Lighting Source to Background

Figure 35:
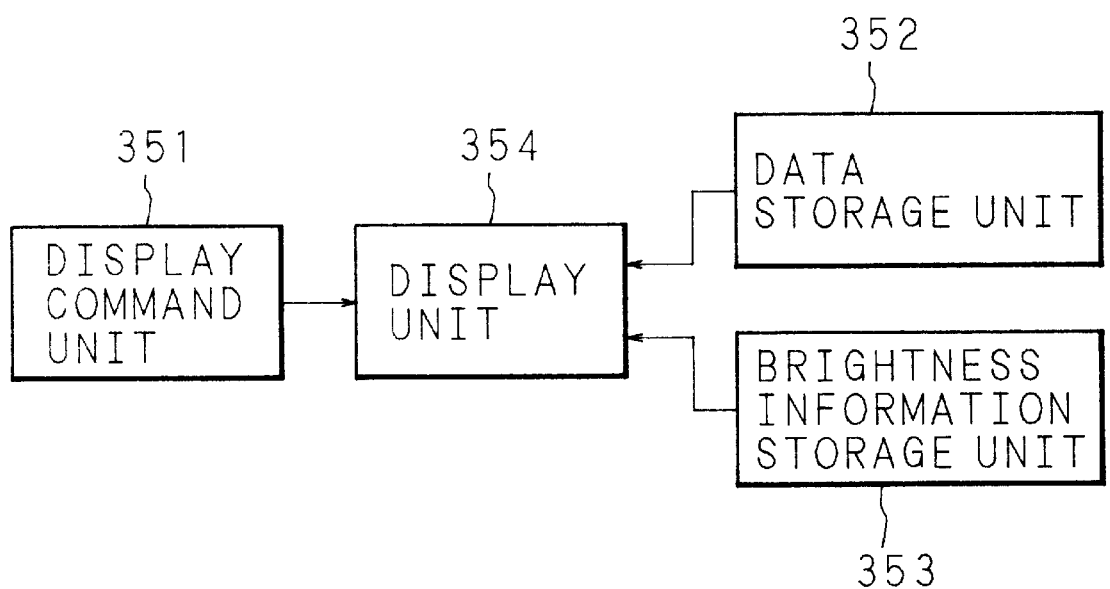
FIG. 35 is a block diagram showing the structure of a tenth embodiment.

An example will now be described in which a character having a light emitting member comprising a spot lighting source exists, the light emitting member periodically emits light and an image of a state in which the light beam is radiated to the background (for example, the sky) is created and displayed. FIG. 35 is a block diagram showing the structure of a tenth embodiment. An image creating apparatus according to the tenth embodiment comprises a display command unit 351 for outputting a command to display various objects (a character, a beam from the light emitting member, a background and the like), a data storage unit 352, such as a CD, in which three-dimensional image data obtained by actual photographing of various objects has been stored, a brightness information storage unit 353 for storing brightness information of a plurality of gradations (for example, 64 gradients) realized by a beam from the spot lighting source and a display unit 354 for creating and displaying a variety of images including an image obtained in a case where a beam is radiated to a background (for example, the sky) in accordance with the display command from the display command unit 351.

Figure 36:
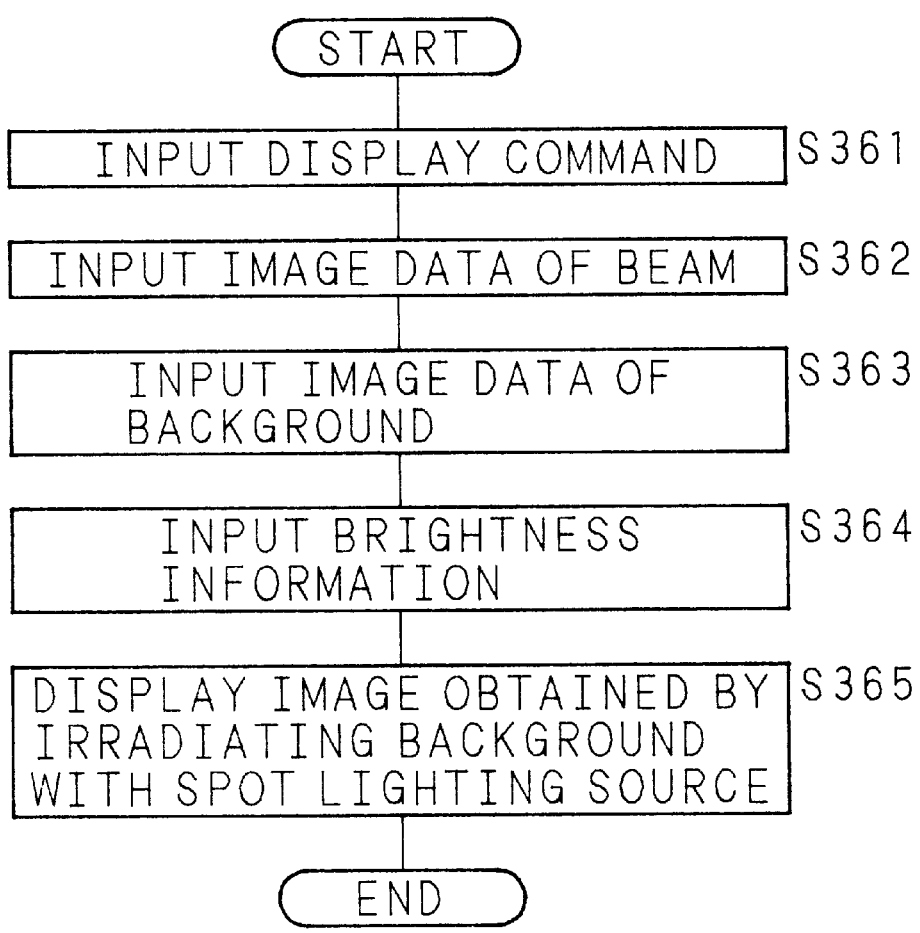
FIG. 36 is a flow chart showing a process according to the tenth embodiment.
Figure 37:
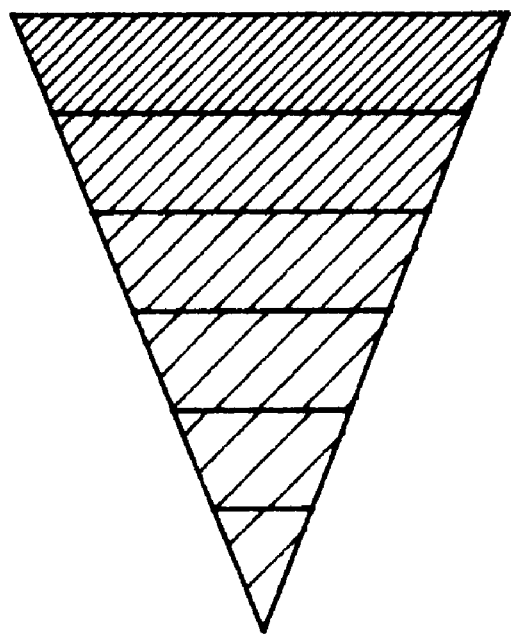
FIG. 37 is a schematic view showing brightness information according to the tenth embodiment.

The operation of the tenth embodiment will now be described with reference to a flow chart of the process in the display unit 354 shown in FIG. 36 and FIG. 37 which is a schematic view showing brightness information of the plural gradations.

Initially, the display unit 354 receives from the display command unit 351 a display command to cause the light emitting member of the character to emit light (S361). To follow the display command, the display unit 354 read image data of the beam stored in the data storage unit 352 (S362), and read image data of the background (S363). Moreover, the display unit 354 read, from the brightness information storage unit 353, brightness information of the plural gradations realized by the beam emitted from the spot lighting source (S364). As shown in FIG. 37, a beam radiated from the spot lighting source is in a triangular shape on a two-dimensional plane. Thus, the brightness is high at a position near the spot lighting source and the brightness is low at a position distant from the spot lighting source. Brightness information to be read indicates the brightness distribution obtained by actual photographing of a beam emitted from the spot lighting source.

Thus, an image in a state where the background is irradiated with the beam is created and displayed in the color obtained by mixing the color of the beam and the color of the background (S365). When the color of the beam and that of the background are mixed to determine the display color, the mixture ratio of the two colors is changed in accordance with brightness information of the pixel. That is, the mixture ratio of the color of the beam is raised in a region in which the brightness is high. In a region in which the brightness is low, the mixture ratio of the color of the background is raised. As a result, a glare beam can be emphasized in the region near the spot lighting source, while a transparent image in which the background is highlighted in a dim beam can be expressed in a region distant from the spot lighting source. Thus, the reality can be improved.

Although the above-mentioned embodiment is arranged in such a manner that the mixture ratio is changed in accordance with brightness information of the beam emitted from the spot lighting when the color of the beam and that of the background are mixed, a display color of the background which is irradiated with the beam from the spot lighting source and the only the brightness of which is raised may be employed in accordance with read brightness information of the plural gradations realized by the beam. In this case, an image having improved reality can be displayed in which the background is loomed in the beam. Note that the structure of the image creating apparatus and the process in the foregoing case are basically the same as that according to the above-mentioned embodiment (see FIGS. 35 and 36).

Eleventh Embodiment: Synchronous Motion of Two Characters

Figure 38:
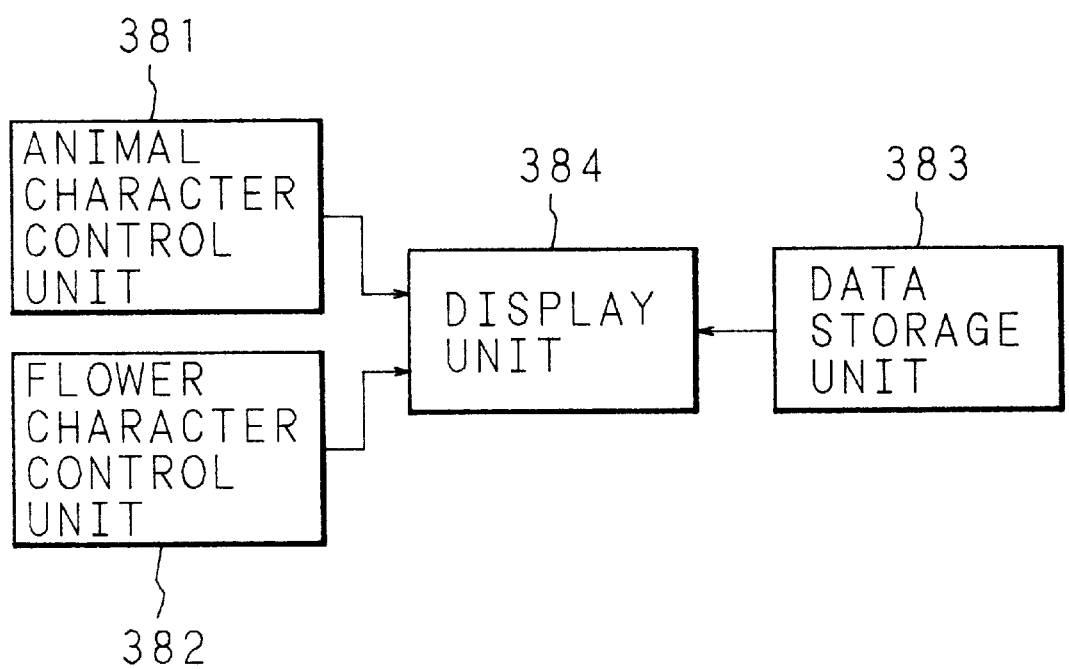
FIG. 38 is a block diagram showing the structure of an eleventh embodiment.

A case will now be described in which an image of a cooperative action of a light emitting motion of an animal and a flowering motion of a plant is created and displayed such that a flower character of the plant starts flowering when the plant is irradiated with the light emitting member of the animal character. FIG. 38 is a block diagram showing the structure of an eleventh embodiment. An image creating apparatus according to the eleventh embodiment comprises an animal character control unit 381 for outputting a command to emit light from the animal character having the light emitting member; a flower character control unit 382 for outputting a command to display the flower character, a data storage unit 383, such as a CD, which stores image data of a variety of objects including the animal character and the flower character and a display unit 384 for creating and displaying various images including an image of the cooperative action of the light emission of the animal character and the flowering of the flower character.

Figure 39:
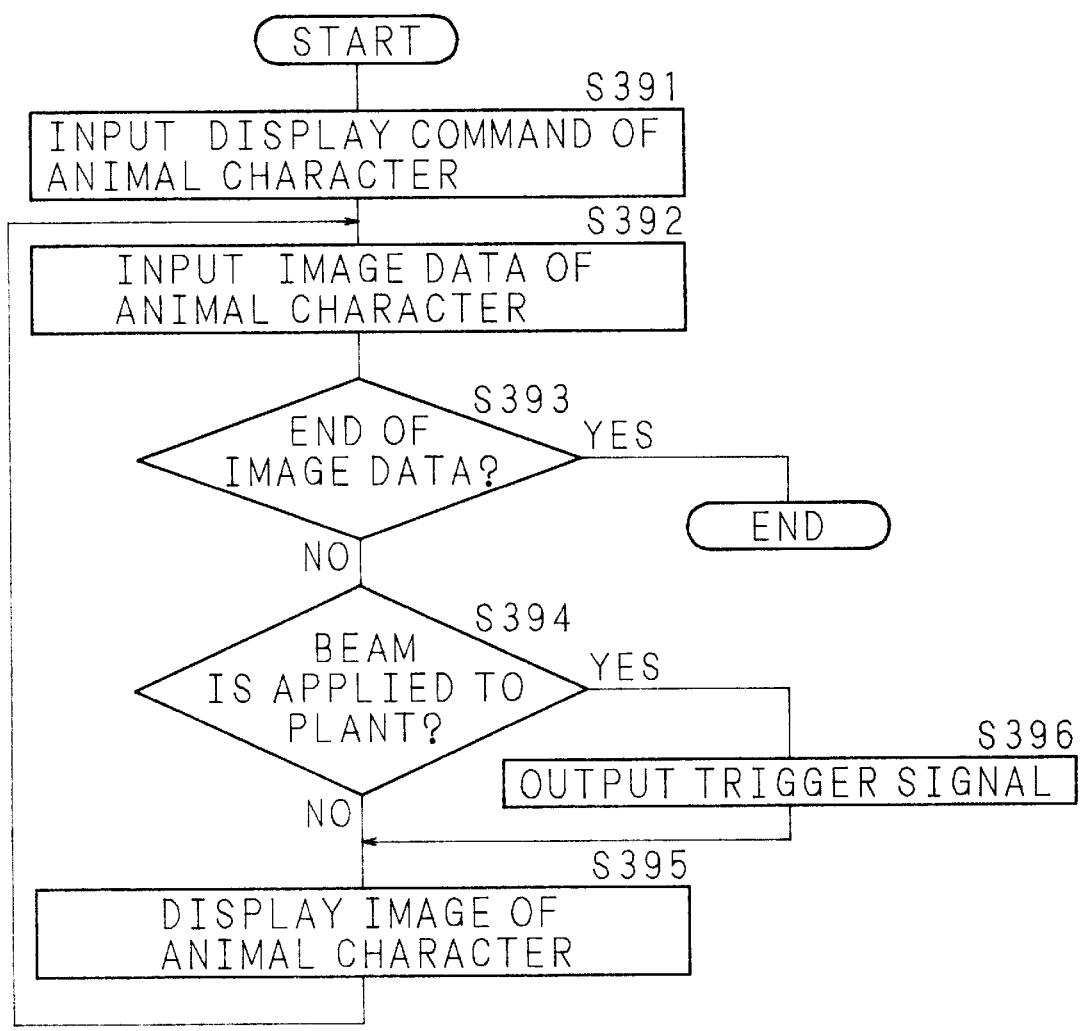
FIG. 39 is a flow chart showing a process according to the eleventh embodiment.
Figure 40:
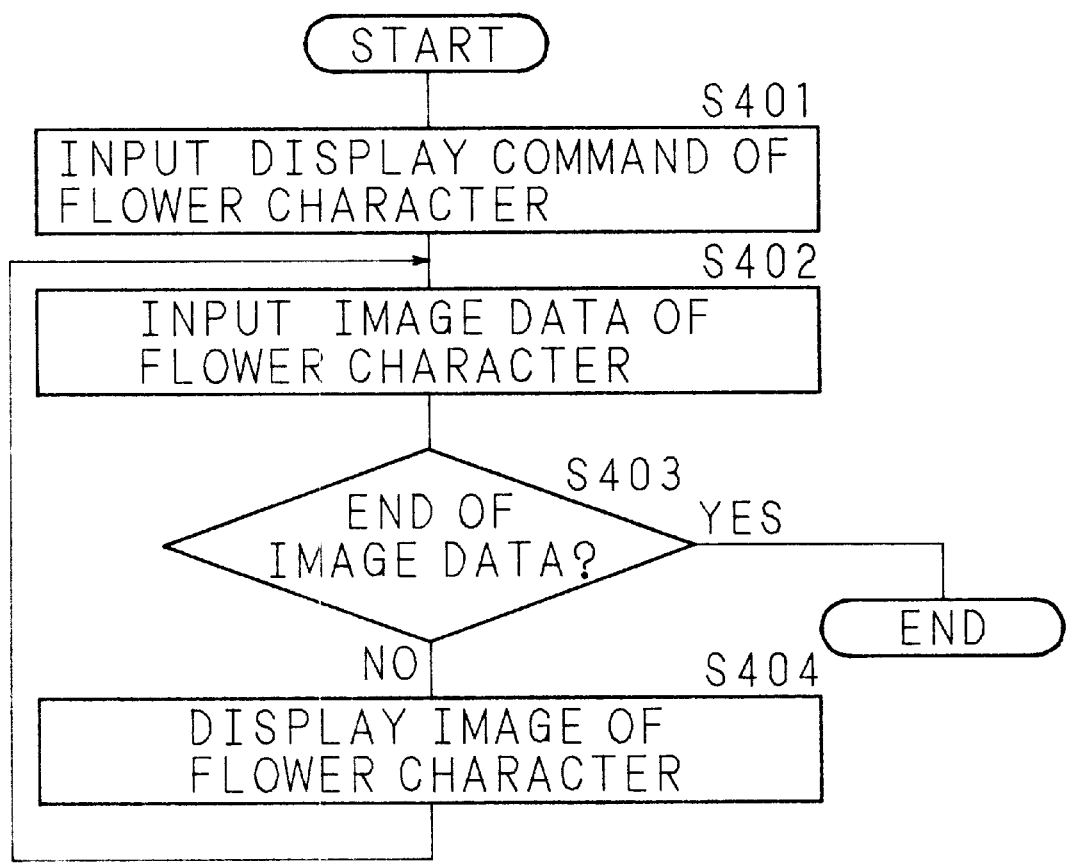
FIG. 40 is a flow chart showing a process according to the eleventh embodiment.

The operation of the eleventh embodiment will now be described with reference to FIGS. 39 and 40 which are flow charts of the process which is performed by the display unit 384. FIG. 39 is a flow chart of the process for displaying the animal character and FIG. 40 is a flow chart of the process for displaying the flower character.

Initially, the display unit 384 receives, from the animal character control unit 381, a command to display the animal character (S391). To follow the display command, the display unit 384 read image data of the animal character stored in the data storage unit 383 (S392). Then, whether or not image data for all frames has been read is judged (S393). Then, whether or not read image data indicates a state where a beam from the light emitting member of the animal character is applied to the plant (S394). If image data indicates the state where the plant is irradiated with the beam, a trigger signal is output to the flower character control unit 382 (S396), and the process proceeds to S395. If image data does not indicate the foregoing state, the operation proceeds directly to S395. In accordance with read image data, the image of the animal character is displayed (S395). Then, the operation returns to S392 so that the processes in S392 to S395 are repeated until image data of the animal character for all frames is read from the data storage unit 383.

On the other hand, the display unit 384 receives a command output in response to the foregoing trigger signal and arranged to cause the flower character to be displayed (S401). To follow the display command, the display unit 384 reads image data of the flower character stored in the data storage unit 383 (S402). Then, whether or not image data for all frames has been read is judged (S403). In accordance with read image data, the image of the flower character is displayed (S404). Then, the operation returns to S402 so that the processes in S402 to S404 are repeated until image data of the flower character for all frames is read from the data storage unit 383.

As described above, an image can be created and displayed in which the flower character starts flowering in synchronization with the timing at which irradiation of the plant with the beam emitted from the light emitting member of the animal character is started. Thus, a state can be expressed in which the light irradiation motion of the animal character and the flowering motion of the flower character are synchronized with each other.

Twelfth Embodiment: Display of Semitransparent Object

Figure 41:
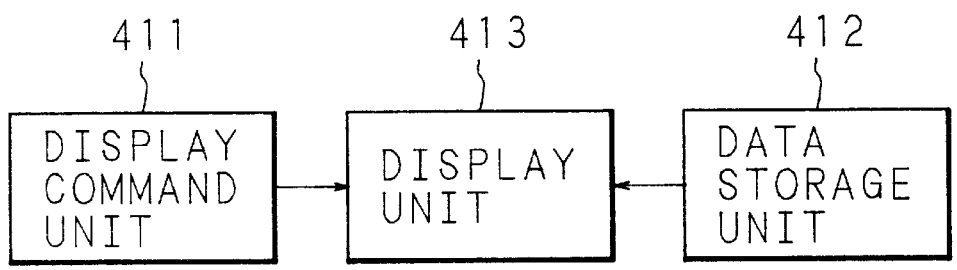
FIG. 41 is a block diagram showing the structure of a twelfth embodiment.

A case will now be described in which an image is created and displayed in which a rainbow appears in front of a background mountain and branches of a tree can be observed. FIG. 41 is a block diagram showing the structure of a twelfth embodiment. An image creating apparatus according to the twelfth embodiment comprises a display command unit 411 for outputting a command to display various objects including the rainbow and the branches, a data storage unit 412, such as a CD storing image data of a variety of objects including the rainbow and the branches and a display unit 413 for creating and displaying various images including the mountain, the rainbow and the branches of the tree having the above-mentioned positional relationship. Note that image data to be stored includes Z values of the objects (the rainbow, the branches and the mountain).

Figure 42:
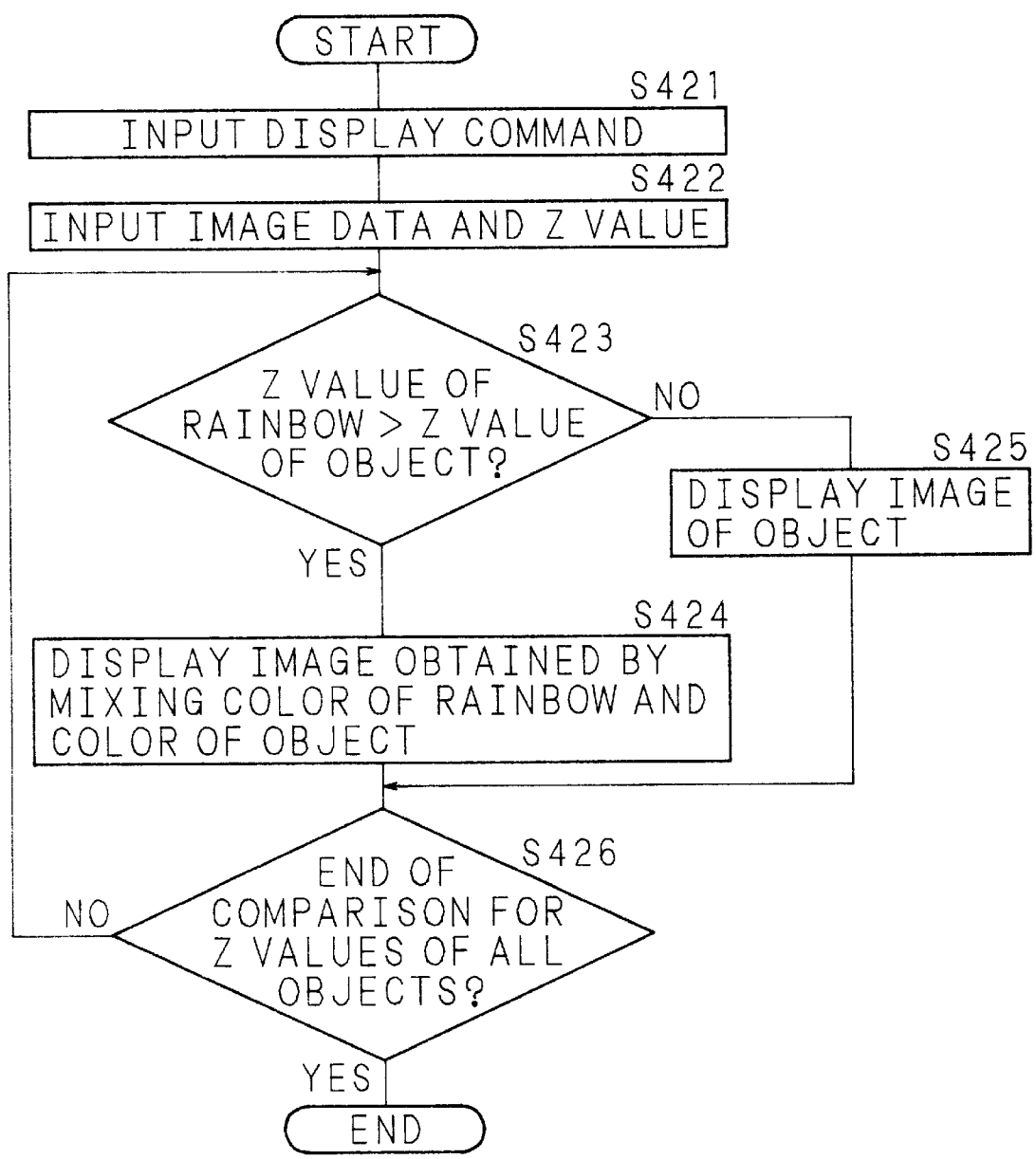
FIG. 42 is a flow chart showing a process according to the twelfth embodiment.

The operation of the twelfth embodiment will now be described with reference to a flow chart in FIG. 42 showing the process in the display unit 413.

Initially, the display unit 413 receives, from the display command unit 411, a command to display the rainbow, mountain and the branches (S421). To follow the display command, the display unit 413 reads image data of the rainbow, the mountain and the branches stored in the data storage unit 412 including their Z values (S422). The Z value of the rainbow and the Z values of the other objects are subjected to comparisons (S423). If the Z value of the rainbow is larger than that of the other object (YES in S423), a display color obtained by mixing the color of the rainbow and that of the object is used to display an image in which the object exists behind the rainbow such that the object is visible through the rainbow (S424). When the Z value of the rainbow and that of the mountain are subjected to a comparison, an image is displayed in this embodiment in which the rainbow appears in front of the mountain and thus the Z value of the rainbow is larger than that of the mountain (YES in S423). Therefore, the display color obtained by mixing the color of the rainbow and that of the mountain is used to display an image in which the mountain is visible through the rainbow (S424).

If an object which has not been subjected to the comparison of the Z value (NO in S426), the Z value of the rainbow and the Z value of the other object are subjected to comparisons (S423). If the Z value of the rainbow is smaller than that of the other object (NO in S423), the image of the object is displayed (S425). Since an image is displayed in this embodiment in which the branch exists in front of the rainbow and thus the Z value of the rainbow is smaller than that of the branch when the Z value of the rainbow and that of the branch are subjected to a comparison (NO in S423), only the branch is displayed. Thus, an image in which the rainbow is hindered by the branch is displayed (S425).

Although the foregoing embodiment has been described about the rainbow, a similar method may, of course, be employed in another case in which another semitransparent body, such as fog or a cloud, is displayed.

Figure 43:
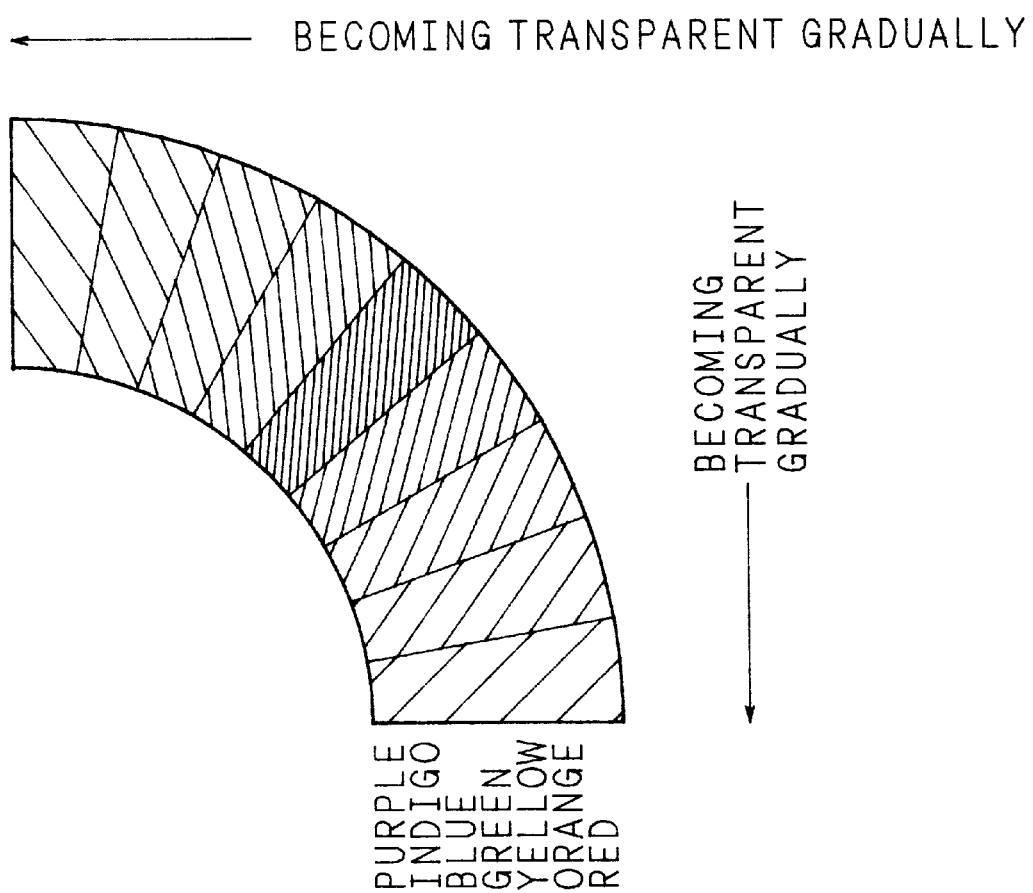
FIG. 43 is a schematic view showing an example of display of a rainbow according to the twelfth embodiment.

A method of displaying the rainbow will additionally be displayed. As shown in FIG. 43, a circular arc in seven colors is drawn and the semitransparency of the rainbow is expressed by mixing the color of the background in the rear of the rainbow and the colors of the rainbow so that the rainbow is expressed. When an actual rainbow is observed, the central portion of the rainbow has a clear rainbow color and the peripheral portion of the rainbow is dimmed. To express a rainbow having reality, the present invention is arranged in such a manner that the colors of the rainbow and the color of the background are mixed such that the rate of the colors of the rainbow is made to be highest in the central portion of the rainbow and the same is lowered toward the end portion. As a result, a rainbow with reality can be expressed in which the central portion is clearly displayed and the end portion is relatively dimmed.

If a circular arc in seven colors is simply drawn, there is a possibility that the boundary between the adjacent colors becomes unnatural. Therefore, the present invention is arranged in such a manner that a display color obtained by mixing the two colors is used in the boundary portion between the two colors to prevent jaggy in the boundary portion.

As described above, according to first to eighth embodiments, delicate sway of the water surface, shadow, ripples, waves and spray of a rain on the water surface can be expressed on an image. According to ninth to twelfth embodiments, an object reflected to the water surface, a beam radiated from a spot lighting source and a semitransparent object can naturally be displayed on a two-dimensional plane with satisfactory reality. The image creating process according to the present invention does not necessitate the system, such as the CPU, to bear a heavy load. Even with the performance of a personal computer, an image of the foregoing type can be displayed in real time. Therefore, the present invention enables the system for realizing a world in an artificial creature lives on the personal computer to improve the reality.

Figure 44:
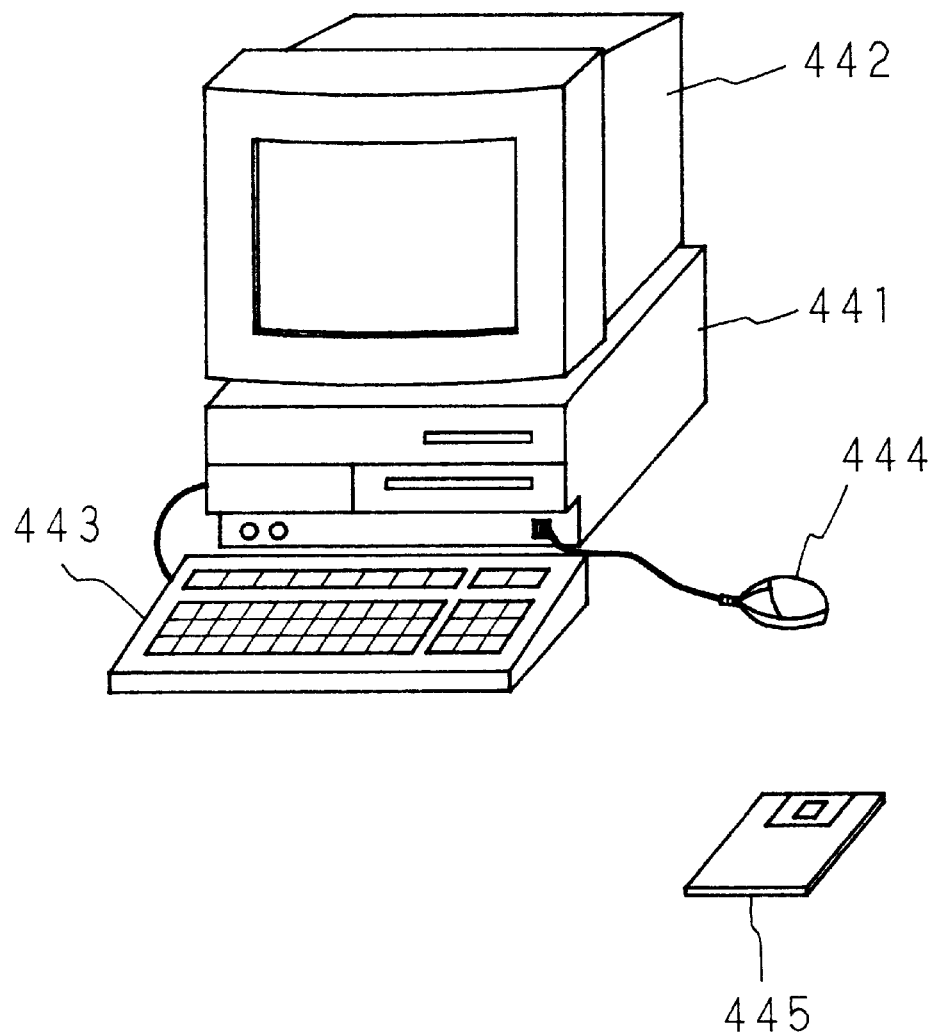
FIG. 44 is a schematic view showing the structure of a system according to the present invention.

FIG. 44 is a schematic view showing the structure of the system for embodying the foregoing embodiments. The system comprises a computer 441, a display unit 422, a keyboard 433 connected to the computer 441 and arranged to input data by using the keys and a mouse 444 with which instructions are input. The computer 441 uses a program for performing the above-mentioned processes which is installed from a computer memory product 445, such as a magnetic disk or a CD-ROM, on which the program has been recorded.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalent of such metes and bounds thereof are therefore intended to be embraced by the claims.

What is claimed is:

1. An apparatus for creating a kinetic picture from an object containing minute moves such as animals and natural scenes including wavy, glittering water surfaces, said apparatus comprising:

means for inputting an image to be processed and information for defining a region of a water surface included in the image to be processed;

means for creating a plurality of slice regions by dividing, into a predetermined direction, the region in the image to be processed which has been defined in accordance with water surface region information;

means for generating a sway width for each of the divided slice regions; and means for overwriting the slice regions on the image to be processed in such a manner that each of the slice regions is swayed by the generated sway width in the direction of division.

2. An image creating apparatus, comprising:

means for inputting position information of an object which moves on a background image and information for setting a range in which the object affects on the water surface in the background image;

detection means for detecting a fact that the position of the object has been introduced into the range in which the water surface is affected;

means for creating a plurality of slice regions by dividing, into a predetermined direction, an image adjacent to the object when detection has been performed by said detection means;

means for generating a sway width for each of the divided slice regions; and means for overwriting the slice regions on the background image in such a manner that each of the slice regions is swayed by the generated sway width in the direction of division.

3. An image creating apparatus, comprising:

means for creating a plurality of slice regions by dividing a shadow pattern, which has been created, into a predetermined direction;

means for generating a sway width for each of the divided slice regions; and means for overwriting the slice regions on a portion adjacent to an object drawn on an image to be processed in such a manner that each of the slice regions is swayed by the generated sway width in the direction of division.

4. An image creating apparatus according to claim 3, wherein said sway width generating means adds the sway width to correspond to a movement vector of the object.

5. An image creating apparatus, comprising:

means for calculating the position at which an object which will be drawn on an image to be processed is reflected on a water surface in accordance with position information of the object and position information of the water surface included in the image to be processed;

means for creating a plurality of slice regions by dividing a shadow pattern, which has been created, into a predetermined direction;

means for generating a sway width for each of the divided slice regions; and means for overwriting the slice regions on the reflection position in such a manner that each of the slice regions is swayed by the generated sway width in the direction of division.

6. An image creating apparatus according to claim 5, wherein
said sway width generating means adds the sway width to correspond to a movement vector of the object.

7. An image creating apparatus, comprising:
means for detecting a fact that an object which will be drawn on an image to be processed has passed through a water surface included in the image to be processed in accordance with present position information of the object, position information of the object before a predetermined period of time and position information of the water surface included in the image to be processed;
means for calculating the coordinates of the center of an ellipse to be drawn in accordance with position information of the object and/or position information of the object before the predetermined period of time and position information of the water surface;
determining means for determining the size of the ellipse to be drawn; and
ellipse drawing means for overwriting the ellipse on the image to be processed in accordance with the calculated coordinates of center and the determined size;
wherein said ellipse drawing means repeats drawing plural times and said determining means determines the size in such a manner that ellipses which will be drawn later have larger sizes.

8. An image creating apparatus according to claim 7, wherein
said ellipse drawing means performs drawing by copying the colors of pixels adjacent to pixels of the ellipse to be drawn in such a manner that ellipses which will be drawn later have pixels to be copied and pixels to be drawn, the distance between which is shortened.

9. An image creating apparatus according to claim 7, wherein
said ellipse drawing means performs overwriting in such a manner that a plurality of ellipses are written each having a center slightly deviated from the center calculated by said ellipse center calculating means.

10. An image creating apparatus, comprising:
dividing means for dividing a region of a water surface included in a two-dimensional image created by projecting a virtual three-dimensional space from a predetermined viewpoint into a plurality of regions; and
elongating means for elongating the plurality of the divided regions in a direction of the height on the virtual three-dimensional space;
wherein said elongating means periodically elongates the regions in the direction of the height on the corresponding virtual three-dimensional space in the sequential order of the depth on the virtual three-dimensional space.

11. An image creating apparatus, comprising:
means for setting an initial position of a plurality of lines in the direction of the depth in order to set a plurality of lines on which waves are drawn on a region of a water surface included in a two-dimensional image created by projecting a virtual three-dimensional space from a predetermined viewpoint;
means for setting control data for setting pixels for displaying the colors of waves different from the colors of the water surface and pixels for as it is displaying the colors of the water surface for each of the plurality of lines;
means for setting the sway width between the positions at which the plural lines are drawn and the initial position; and
drawing means for drawing the pixels at the positions at which the lines are drawn and set by said control data setting means in the colors of the waves;
wherein the sway width is changed at each drawing timing, and said drawing means performs drawing.

12. An image creating apparatus according to claim 11, wherein
the color in which each line is drawn is repeated in such a manner that colors brighter than the colors of the water surface and colors darker than the colors of the water surface are alternately repeated at each drawing timing.

13. An image creating apparatus, comprising:
means for setting, in a region of the water surface in the image to be processed, coordinates at which sprays are randomly generated;
means for displaying images of sprays which have been created, at the coordinates; and
means for drawing ellipses around the coordinates, the ellipses being enlarged periodically or for each of predetermined frames.

14. An image creating apparatus, comprising:
means for setting a plurality of regions for expressing sprays of a rain on a region of a water surface included in a two-dimensional image created by projecting a virtual three-dimensional space from a predetermined viewpoint;
means for setting control data for setting pixels for displaying the colors of waves different from the colors of the water surface and pixels for as it is displaying the colors of the water surface for each of lines corresponding to the plurality of the regions;
means for randomly setting the positions at which the lines are drawn in the range of the regions; and
means for drawing the pixels at the positions at which the lines are drawn and set by said control data setting means in the colors of the waves.

15. An image creating apparatus for creating an image for displaying, on a two-dimensional plane, a state where an object is reflected on a water surface by using image data of the object and that of the water surface, comprising:
means for, at a predetermined ratio, reducing image data of the object in a direction in which the object approaches the water surface or moves away from the water surface;
means for obtaining reduced and inverted image data by inverting reduced image data in said direction;
means for obtaining the position at which the image to be created is displayed by calculating the two-dimensional coordinates when the object is reflected on the water surface; and
means for creating the image by superimposing reduced and inverted image data on image data of the water surface at the obtained display position.

16. An image creating apparatus according to claim 15, further comprising:
means for creating a plurality of slice regions by dividing a predetermined region in image data of the water surface into a predetermined direction:

means for setting a sway width for each of the divided slice regions; and means for superimposing the slice regions on image data of the water surface in such a manner that each of the slice regions is swayed by the set sway width in the direction of division.

17. An image creating apparatus according to claim 15, further comprising:

changing means for changing the mixture ratio of the color of the object and the color of water in accordance with the distance of the object from the water surface when reduced and inverted image data is superimposed on image data of the water surface.

18. An image creating apparatus for creating an image for displaying, on a two-dimensional plane, a state where a background is irradiated with a spot lighting source by using image data of a beam radiated from the spot lighting source and that of the background, comprising:

means for storing brightness information of a plurality of gradations of image data of the beam radiated from the spot lighting source;

means for determining a color for use in a state where the background is irradiated with the spot lighting source by mixing the color of the radiated beam and the color of the background; and means for changing a mixture ratio for mixing the color of the radiated beam and the color of the background in accordance with the brightness information.

19. An image creating apparatus for creating an image for displaying, on a two-dimensional plane, a state where a background is irradiated with a spot lighting source by using image data of a beam radiated from the spot lighting source and that of the background, comprising:

means for storing brightness information of a plurality of gradations of image data of the beam radiated from the spot lighting source; and means for changing the brightness of the color of the region of the background irradiated with the beam radiated from the spot lighting source in accordance with the brightness information.

20. An image creating apparatus for creating an image for displaying, on a two-dimensional plane, a state of synchronization between a first object and a second object with time by using image data of the first object and that of the second object, comprising:

first storage means for storing image data of the first object;

second storage means for storing image data of the second object;

means for judging whether or not image data indicating a specific motion state of the first object has been read from said first storage means; and means for reading image data indicating a specific motion state of the second object from said second storage means in a case where image data indicating the specific motion state of the first object has been read.

21. An image creating apparatus for creating an image for displaying, on a two-dimensional plane, a state in which a first object and a semitransparent second object are superimposed in a three-dimensional space by using image data of the first object and that of the second object, comprising:

means for judging whether the first object or the second object is positioned more forwards in the three-dimensional space; and means for displaying an image corresponding to image data in a color obtained by mixing the color of the first object and the color of the second object in a case where the second object is positioned more forwards than the first object and displaying an image corresponding to image data of the first object in a case where the first object is positioned more forwards than the second object.

22. An image creating apparatus according to claim 21, further comprising:

means for changing a mixture ratio for mixing the color of the first object and the color of the second object in the central and peripheral portions of the second object in a case where the second object is positioned more forwards than the first object.

23. An image creating method for creating an image for displaying, on a two-dimensional plane, a state where an object is reflected on a water surface by using image data of the object and that of the water surface, comprising the steps of:

reducing image data of the object in a direction in which the object approaches the water surface or moves away from the water surface at a predetermined ratio;

obtaining reduced and inverted image data by inverting reduced image data in said direction;

obtaining the position at which the image to be created is displayed by calculating the two-dimensional coordinates when the object is reflected on the water surface; and creating the image by superimposing reduced and inverted image data on image data of the water surface at the obtained display position.

24. An image creating method according to claim 23, further comprising the steps of:

creating a plurality of slice regions by dividing a predetermined region in image data of the water surface into a predetermined direction;

setting a sway width for each of the divided slice regions; and superimposing the slice regions on image data of the water surface in such a manner that each of the slice regions is swayed by the set sway width in the direction of division.

25. An image creating method according to claim 23, wherein a color obtained by mixing the color of the object and the color of water for use when reduced and inverted image data is superimposed on image data of the water surface is determined in accordance with the distance of the object from the water surface and by using the following equation:

mixed color=(color of water)×$h$+(color of object)×(1−$h$)

where h is a relative height of the object from the water surface when the height realized when the object is not reflected on the water surface is assumed to be 1.

26. An image creating method for creating an image for displaying, on a two-dimensional plane, a state where a background is irradiated with a spot lighting source by using image data of a beam radiated from the spot lighting source and that of the background, comprising the steps of:

storing brightness information of a plurality of gradations of image data of the beam radiated from the spot lighting source;

determining a color for use in a state where the background is irradiated with the spot lighting source by mixing the color of the radiated beam and the color of the background; and changing a mixture ratio for mixing the color of the radiated beam and the color of the background in accordance with the brightness information.

27. An image creating method according to claim 26, wherein the mixture ratio of the color of the radiated beam is raised in a high brightness portion and the mixture ratio of the color of the background is raised in a low brightness portion.

28. An image creating method according to claim 26, wherein the spot lighting source is a light emitting member provided for an animal character.

29. An image creating method for creating an image for displaying, on a two-dimensional plane, a state where a background is irradiated with a spot lighting source by using image data of a beam radiated from the spot lighting source and that of the background, comprising the steps of:

storing brightness information of a plurality of gradations of image data of the beam radiated from the spot lighting source; and changing the brightness of the color of the region of the background irradiated with the beam radiated from the spot lighting source in accordance with the brightness information.

30. An image creating method for creating an image for displaying, on a two-dimensional plane, a state of synchronization between a first object and a second object with time by using image data of the first object and that of the second object, comprising the steps of:

reading three-dimensional image data of the first object;

judging whether or not image data indicating a specific motion state of the first object has been read; and reading image data indicating a specific motion state of the second object in a case where image data indicating the specific motion state of the first object has been read.

31. An image creating method according to claim 30, wherein the first object is an animal character having a light emitting member, the second object is a plant character having a flower, the specific motion state of the first object is a state where the animal character irradiates the plant character with a beam emitted from the light emitting member, and the specific motion state of the second object is a state where the plant character causes the flower to bloom.

32. An image creating method for creating an image for displaying, on a two-dimensional plane, a state where a first object and a semitransparent second object are superimposed in a three-dimensional space by using image data of the first object and that of the second object, comprising the steps of:

judging whether the first object or the second object is positioned more forwards in the three-dimensional space;

displaying an image corresponding to image data in a color obtained by mixing the color of the first object and the color of the second object in a case where the second object is positioned more forwards than the first object; and displaying an image corresponding to image data of the first object in a case where the first object is positioned more forwards than the second object.

33. An image creating method according to claim 32, wherein the mixture ratio of the color of the second object is raised in the central portion of the second object as compared with the peripheral portion of the second object in a case where the second object is positioned more forwards than the first object.

34. An image creating method according to claim 32, wherein the second object is an object selected from a group consisting of a rainbow, fog and a cloud.

35. A computer memory product storing a computer program for creating an image for displaying, on a two-dimensional plane, a state where an object is reflected on a water surface by using image data of the object and that of the water surface, said computer program comprising the steps of:

reducing image data of the object in a direction in which the object approaches the water surface or moves away from the water surface at a predetermined ratio;

obtaining reduced and inverted image data by inverting reduced image data in said direction;

obtaining the position at which image to be created is displayed by calculating the two-dimensional coordinates when the object is reflected on the water surface; and creating the image by superimposing reduced and inverted image data on image data of the water surface at the obtained display position.

36. A computer memory product storing a computer program for creating an image for displaying, on a two-dimensional plane, a state where a background is irradiated with a spot lighting source by using image data of a beam radiated from the spot lighting source and that of the background, said computer program comprising the steps of:

storing brightness information of a plurality of gradations of image data of the beam radiated from the spot lighting source;

determining a color for use in a state where the background is irradiated with the spot lighting source by mixing the color of the radiated beam and the color of the background; and changing a mixture ratio for mixing the color of the radiated beam and the color of the background in accordance with the brightness information.

37. A computer memory product storing a computer program for creating an image for displaying, on a two-dimensional plane, a state where a background is irradiated with a spot lighting source by using image data of a beam radiated from the spot lighting source and that of the background, said computer program comprising the steps of:

storing brightness information of a plurality of gradations of image data of the beam radiated from the spot lighting source; and changing the brightness of the color of the region of the background irradiated with the beam radiated from the spot lighting source in accordance with the brightness information.

38. A computer memory product storing a computer program for creating an image for displaying, on a two-dimensional plane, a state of synchronization between a first object and a second object with time by using image data of the first object and that of the second object, comprising:

reading image data of the first object;

judging whether or not image data indicating a specific motion state of the first object has been read; and reading image data indicating a specific motion state of the second object in a case where image data indicating the specific motion state of the first object has been read.

39. A computer memory product storing a computer program for creating an image for displaying, on a two-dimensional plane, a state where a first object and a semitransparent second object are superimposed in a three-dimensional space by using image data of the first object and that of the second object, said computer program comprising the steps of:

judging whether the first object or the second object is positioned more forwards in the three-dimensional space;

displaying an image corresponding to image data in a color obtained by mixing the color of the first object and the color of the second object in a case where the second object is positioned more forwards than the first object; and displaying an image corresponding to image data of the first object in a case where the first object is positioned more forwards than the second object.

40. A computer memory product having computer readable program code means capable of reading by a computer for creating an image for displaying, on a two-dimensional plane, a state where an object is reflected on a water surface by using image data of the object and that of the water surface, said computer readable program code means comprising:

program code means for causing the computer to reduce image data of the object in a direction in which the object approaches the water surface or moves away from the water surface at a predetermined ratio;

program code means for causing the computer to obtain reduced and inverted image data by inverting reduced image data in said direction;

program code means for causing the computer to obtain the position at which image to be created is displayed by calculating the two-dimensional coordinates when the object is reflected on the water surface; and program code means for causing the computer to create the image by superimposing reduced and inverted image data on image data of the water surface at the obtained display position.

41. A computer memory product having computer readable program code means capable of reading by a computer for creating an image for displaying, on a two-dimensional plane, a state where a background is irradiated with a spot lighting source by using image data of a beam radiated from the spot lighting source and that of the background, said computer readable program code means comprising:

program code means for causing the computer to store brightness information of a plurality of gradations of image data of the beam radiated from the spot lighting source;

program code means for causing the computer to determine a color for use in a state where the background is irradiated with the spot lighting source by mixing the color of the radiated beam and the color of the background; and program code means for causing the computer to change a mixture ratio for mixing the color of the radiated beam and the color of the background in accordance with the brightness information.

42. A computer memory product having computer readable program code means capable of reading by a computer for creating an image for displaying, on a two-dimensional plane, a state where a background is irradiated with a spot lighting source by using image data of a beam radiated from the spot lighting source and that of the background, said computer readable program code means comprising:

program code means for causing the computer to store brightness information of a plurality of gradations of image data of the beam radiated from the spot lighting source; and program code means for causing the computer to change the brightness of the color of the region of the background irradiated with the beam radiated from the spot lighting source in accordance with the brightness information.

43. A computer memory product having computer readable program code means capable of reading by a computer for creating an image for displaying, on a two-dimensional plane, a state of synchronization between a first object and a second object with time by using image data of the first object and that of the second object, said computer readable program code means comprising:

program code means for causing the computer to read image data of the first object;

program code means for causing the computer to judge whether or not image data indicating a specific motion state of the first object has been read; and program code means for causing the computer to read image data indicating a specific motion state of the second object in a case where image data indicating the specific motion state of the first object has been read.

44. A computer memory product having computer readable program code means capable of reading by a computer for creating an image for displaying, on a two-dimensional plane, a state where a first object and a semitransparent second object are superimposed in a three-dimensional space by using image data of the first object and that of the second object, said computer readable program code means comprising:

program code means for causing the computer to judge whether the first object or the second object is positioned more forwards in the three-dimensional space;

program code means for causing the computer to display an image corresponding to image data in a color obtained by mixing the color of the first object and the color of the second object in a case where the second object is positioned more forwards than the first object; and program code means for causing the computer to display an image corresponding to image data of the first object in a case where the first object is positioned more forwards than the second object.

* * * * *